US012436384B2

(12) United States Patent
Klug et al.

(10) Patent No.: US 12,436,384 B2
(45) Date of Patent: Oct. 7, 2025

(54) INCREASED DEPTH OF FIELD FOR MIXED-REALITY DISPLAY

(71) Applicant: Magic Leap, Inc., Plantation, FL (US)

(72) Inventors: Michael Anthony Klug, Austin, TX (US); William Hudson Welch, Fort Lauderdale, FL (US); Jason Schaefer, Coral Springs, FL (US); Björn Nicolaas Servatius Vlaskamp, Plantation, FL (US); Robert D. Tekolste, Fort Lauderdale, FL (US); Michal Beau Dennison Vaughn, Round Rock, TX (US)

(73) Assignee: Magic Leap, Inc., Plantation, FL (US)

( * ) Notice: Subject to any disclaimer, the term of this patent is extended or adjusted under 35 U.S.C. 154(b) by 312 days.

(21) Appl. No.: 18/213,726

(22) Filed: Jun. 23, 2023

(65) Prior Publication Data
US 2023/0333369 A1 Oct. 19, 2023

Related U.S. Application Data

(63) Continuation of application No. 17/116,391, filed on Dec. 9, 2020, now Pat. No. 11,726,318.
(Continued)

(51) Int. Cl.
G02B 27/00 (2006.01)
G02B 27/01 (2006.01)

(52) U.S. Cl.
CPC ..... *G02B 27/0075* (2013.01); *G02B 27/0172* (2013.01); *G02B 2027/0127* (2013.01)

(58) Field of Classification Search
CPC ............ G02B 27/0075; G02B 27/0172; G02B 2027/0127; G02B 7/023; G02B 7/04;
(Continued)

(56) References Cited

U.S. PATENT DOCUMENTS 10,890,823 B1 1/2021 Jiang et al.
10,895,738 B1 1/2021 Sears et al.
(Continued)

FOREIGN PATENT DOCUMENTS

CN 107076984 A 8/2017
CN 108369325 A 8/2018
(Continued)

OTHER PUBLICATIONS

CN202080085459.X, "Notice of Decision to Grant", Mar. 13, 2025, 5 pages. [no translation available].
(Continued)

*Primary Examiner* — Henry Duong
(74) *Attorney, Agent, or Firm* — KILPATRICK TOWNSEND & STOCKTON LLP

(57) ABSTRACT

Optical systems and methods for operation thereof are disclosed. A delimited zone is defined as a function of distance from the optical system based on a VAC limit, the delimited zone having at least one distance threshold. A virtual distance of a virtual depth plane from the optical system at which a virtual object is to be displayed is determined. It is determined whether the virtual distance is outside the delimited zone by comparing the virtual distance to the at least one distance threshold. A collimated pixel beam associated with the virtual object is generated by a projector of the optical system. The collimated pixel beam is modified to generate a modified pixel beam if the virtual distance is outside the delimited zone. Modifying the collimated pixel beam includes converging the collimated pixel beam and/or reducing a diameter of the collimated pixel beam.

20 Claims, 16 Drawing Sheets

Related U.S. Application Data

(60) Provisional application No. 62/946,291, filed on Dec. 10, 2019.

(58) Field of Classification Search
CPC . G02B 7/06; G02B 7/10; G03B 30/00; G11B 7/09; G11B 7/0908; G11B 7/0927; G11B 7/0929; H02K 41/0354; H02K 41/0356
USPC ......................................................... 359/823
See application file for complete search history.

(56) References Cited

U.S. PATENT DOCUMENTS

| | | | |
|---|---|---|---|
| 10,962,787 B1 * | 3/2021 | Lou | G02B 6/0036 |
| 11,726,318 B2 | 8/2023 | Klug et al. | |
| 2008/0117289 A1 | 5/2008 | Schowengerdt et al. | |
| 2017/0160798 A1 | 6/2017 | Lanman et al. | |
| 2019/0018236 A1 | 1/2019 | Perreault et al. | |
| 2019/0107714 A1 | 4/2019 | Ishihara et al. | |
| 2019/0285897 A1 | 9/2019 | Topliss et al. | |
| 2019/0311527 A1 | 10/2019 | Schwab et al. | |
| 2019/0339449 A1 * | 11/2019 | Shipton | G02B 6/122 |
| 2021/0080637 A1 * | 3/2021 | Brick | G02B 27/0172 |
| 2021/0080720 A1 | 3/2021 | Zhao et al. | |
| 2021/0173204 A1 | 6/2021 | Klug et al. | |

FOREIGN PATENT DOCUMENTS

| | | |
|---|---|---|
| CN | 109154723 A | 1/2019 |
| JP | 2019507902 A | 3/2019 |
| WO | 2017139667 A1 | 8/2017 |
| WO | 2018147811 A1 | 8/2018 |
| WO | 2021119171 A1 | 6/2021 |

OTHER PUBLICATIONS

U.S. Appl. No. 17/116,391, "Non-Final Office Action", Dec. 20, 2022, 15 pages.
U.S. Appl. No. 17/116,391, "Notice of Allowance", Mar. 27, 2023, 9 pages.
EP20898664.6, "Extended European Search Report", Dec. 21, 2022, 9 pages.
PCT/US2020/064079, "International Preliminary Report on Patentability", Jun. 23, 2022, 8 pages.
PCT/US2020/064079, "International Search Report and Written Opinion", Mar. 3, 2021, 9 pages.
CN202080085459.X, "Office Action", Oct. 13, 2024, 6 pages. [no translation available].
JP2022-534393, "Office Action" and English translation, Nov. 26, 2024, 10 pages.

* cited by examiner

INCREASED DEPTH OF FIELD FOR MIXED-REALITY DISPLAY

CROSS-REFERENCES TO RELATED APPLICATIONS

This application is a continuation of U.S. patent application Ser. No. 17/116,391, filed Dec. 9, 2020, entitled "INCREASED DEPTH OF FIELD FOR MIXED-REALITY DISPLAY," which is a non-provisional of and claims the benefit of and priority to U.S. Provisional Patent Application No. 62/946,291, filed Dec. 10, 2019, entitled "INCREASED DEPTH OF FIELD FOR MIXED-REALITY DISPLAY," which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide systems and methods for operating a fixed focal plane optical system comprising a microdisplay and a leaky-grating light guide pupil-expanding eyepiece element with a scheme to disrupt human visual system accommodation cues by dynamically extending the depth of field of that system in a compact form factor. Although the present invention is described in reference to an optical system such as an augmented reality (AR) device, the disclosure is applicable to a variety of applications in computer vision and image display systems.

A summary of the invention is provided below in reference to a series of examples. As used below, any reference to a series of examples is to be understood as a reference to each of those examples disjunctively (e.g., "Examples 1-4" is to be understood as "Examples 1, 2, 3, or 4").

Example 1 is a method of operating an optical system, the method comprising: defining, based on a vergence-accommodation conflict (VAC) limit, a delimited zone as a function of distance from the optical system, the delimited zone having at least one distance threshold; determining a virtual distance of a virtual depth plane from the optical system at which a virtual object is to be displayed; determining whether the virtual distance is outside the delimited zone by comparing the virtual distance to the at least one distance threshold; generating, by a projector of the optical system, a collimated pixel beam associated with the virtual object; based on determining that the virtual distance is outside the delimited zone, modifying the collimated pixel beam to generate a modified pixel beam, wherein modifying the collimated pixel beam includes at least one of: converging the collimated pixel beam; or reducing a diameter of the collimated pixel beam; injecting the modified pixel beam into an eyepiece of the optical system; and outputting the modified pixel beam from the eyepiece toward an eye of a user.

Example 2 is an optical system comprising: a projector configured to generate a collimated pixel beam associated with a virtual object; a light modifying device configured to modify the collimated pixel beam to generate a modified pixel beam; an eyepiece configured to output the modified pixel beam; and a processing module configured to perform operations comprising: determining a virtual distance of a virtual depth plane from the optical system at which the virtual object is to be displayed; comparing the virtual distance to at least one distance threshold; and based on comparing the virtual distance to the at least one distance threshold, causing the light modifying device to modify the collimated pixel beam to generate the modified pixel beam.

Example 3 is the optical system of example(s) 2, wherein modifying the collimated pixel beam includes: converging the collimated pixel beam.

Example 4 is the optical system of example(s) 2-3, wherein modifying the collimated pixel beam includes: reducing a diameter of the collimated pixel beam.

Example 5 is the optical system of example(s) 2-4, wherein the operations further comprise: defining a delimited zone as a function of distance from the optical system, the delimited zone including the at least one distance threshold.

Example 6 is the optical system of example(s) 5, wherein comparing the virtual distance to the at least one distance threshold includes: determining whether the virtual distance is outside the delimited zone.

Example 7 is the optical system of example(s) 5-6, wherein the delimited zone is defined based on a VAC limit.

Example 8 is the optical system of example(s) 7, wherein the VAC limit is defined by a user of the optical system.

Example 9 is the optical system of example(s) 2-8, wherein the at least one distance threshold includes an upper distance threshold.

Example 10 is the optical system of example(s) 9, wherein comparing the virtual distance to the at least one distance threshold includes: determining whether the virtual distance is greater than the upper distance threshold.

Example 11 is the optical system of example(s) 10, wherein modifying the collimated pixel beam based on comparing the virtual distance to the at least one distance threshold includes: in response to determining that the virtual distance is greater than the upper distance threshold, causing the light modifying device to modify the collimated pixel beam.

Example 12 is the optical system of example(s) 2-11, wherein the at least one distance threshold includes a lower distance threshold.

Example 13 is the optical system of example(s) 12, wherein comparing the virtual distance to the at least one distance threshold includes: determining whether the virtual distance is less than the lower distance threshold.

Example 14 is the optical system of example(s) 13, wherein modifying the collimated pixel beam based on comparing the virtual distance to the at least one distance threshold includes: in response to determining that the virtual distance is less than the lower distance threshold, causing the light modifying device to modify the collimated pixel beam.

Example 15 is the optical system of example(s) 2-14, wherein the eyepiece is configured to receive the modified pixel beam from the light modifying device.

Example 16 is the optical system of example(s) 2-15, wherein the light modifying device is positioned in an optical path between the projector and the eyepiece.

Example 17 is a method of operating an optical system, the method comprising: determining a virtual distance of a virtual depth plane from the optical system at which a virtual object is to be displayed; comparing the virtual distance to at least one distance threshold; generating, by a projector of the optical system, a collimated pixel beam associated with the virtual object; and based on comparing the virtual distance to the at least one distance threshold, modifying the collimated pixel beam to generate a modified pixel beam.

Example 18 is the method of example(s) 17, wherein modifying the collimated pixel beam includes: converging the collimated pixel beam.

Example 19 is the method of example(s) 17-18, wherein modifying the collimated pixel beam includes: reducing a diameter of the collimated pixel beam.

Example 20 is the method of example(s) 17-19, further comprising: defining a delimited zone as a function of distance from the optical system, the delimited zone including the at least one distance threshold.

Example 21 is the method of example(s) 20, wherein comparing the virtual distance to the at least one distance threshold includes: determining whether the virtual distance is outside the delimited zone.

Example 22 is the method of example(s) 20-21, wherein the delimited zone is defined based on a VAC limit.

Example 23 is the method of example(s) 22, wherein the VAC limit is defined by a user of the optical system.

Example 24 is the method of example(s) 17-23, wherein the at least one distance threshold includes an upper distance threshold.

Example 25 is the method of example(s) 24, wherein comparing the virtual distance to the at least one distance threshold includes: determining whether the virtual distance is greater than the upper distance threshold.

Example 26 is the method of example(s) 25, wherein modifying the collimated pixel beam based on comparing the virtual distance to the at least one distance threshold includes: in response to determining that the virtual distance is greater than the upper distance threshold, modifying the collimated pixel beam.

Example 27 is the method of example(s) 17-26, wherein the at least one distance threshold includes a lower distance threshold.

Example 28 is the method of example(s) 27, wherein comparing the virtual distance to the at least one distance threshold includes: determining whether the virtual distance is less than the lower distance threshold.

Example 29 is the method of example(s) 28, wherein modifying the collimated pixel beam based on comparing the virtual distance to the at least one distance threshold includes: in response to determining that the virtual distance is less than the lower distance threshold, modifying the collimated pixel beam.

Example 30 is the method of example(s) 17-29, further comprising: injecting the modified pixel beam into an eyepiece of the optical system.

Example 31 is the method of example(s) 17-30, further comprising: outputting the modified pixel beam from an eyepiece of the optical system toward an eye of a user.

Example 32 is the method of example(s) 17-31, wherein the collimated pixel beam is modified by a light modifying device positioned in an optical path between the projector and an eyepiece of the optical system.

Numerous benefits are achieved by way of the present disclosure over conventional techniques. For example, embodiments enable a single focal plane system to have several of the same benefits as a two-focal plane system, such as reduced VAC in both the near-field and far-field virtual depth planes. Additionally, since the pixel beam can be modified prior to injection into the eyepiece, embodiments are compatible with existing eyepieces that employ pupil-expansion combiner eyepiece technology. Embodiments also eliminate the need for clipping planes that are often employed for near field depth planes, thereby reducing the inconvenience to users due to virtual content disappearing. Other benefits of the present disclosure will be readily apparent to those skilled in the art.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
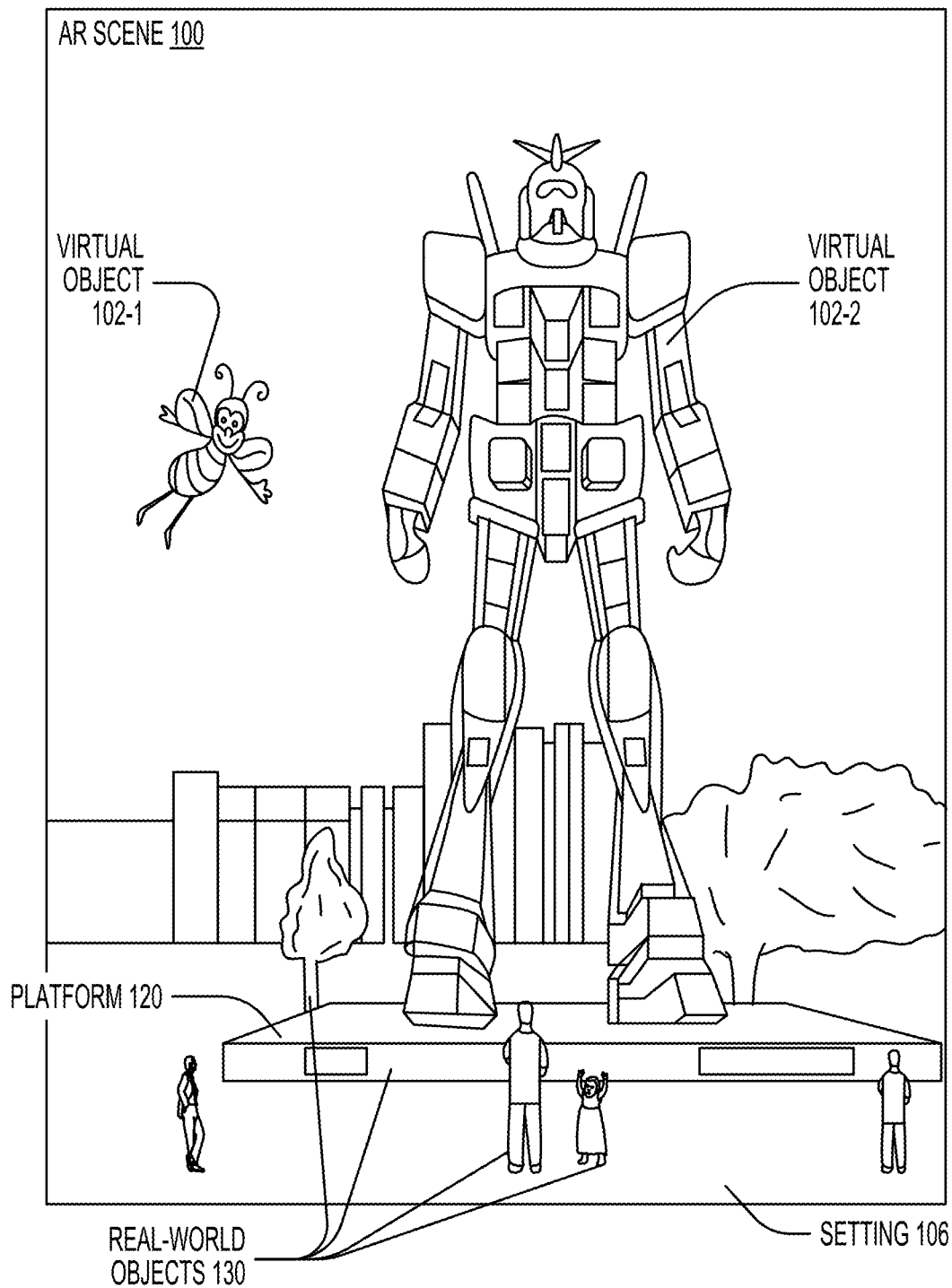
FIG. 1 illustrates an augmented reality (AR) scene as viewed through a wearable AR device.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF SPECIFIC EMBODIMENTS

Mixed-reality (MR) and augmented reality (AR) wearable displays are capable of presenting virtual content to a user over a wide depth range. For many displays, a user may experience varying levels of accommodation-vergence conflict (VAC) at different depths, which occurs when the user's brain receives mismatching cues between the distance of a virtual object from the user's eyes and the focusing distance required for the eyes to focus on that virtual object. VAC leads to visual fatigue, headache, nausea, and eyestrain, and remains a significant source of discomfort for users. Accordingly, to maintain user comfort, modern MR and AR wearable displays may consider a VAC budget allowance when delivering virtual content over a depth range, which may result in a depth range that is significantly reduced.

Various approaches to mitigate VAC have been implemented. One approach includes adding a second depth plane and a vari-focal switch based on eye-tracking to the optical system. Another approach is to add a vari-focal element with the ability to sweep eyepiece focal planes across a broad range. These approaches come with increased volume in the form of additional eyepiece layers and/or through integration of liquid-fillable tunable lens pairs straddling the eyepiece, as well as increased complexity due to complex illumination schemes.

Some embodiments of the present invention provide an optical system with a delimited zone, within which a limited amount of VAC is tolerated by a user, and outside of which an expanded depth of field can be switched on to disrupt human visual system accommodation cues. In some embodiments, the delimited zone can be defined based on a single or multiple fixed focal plane(s) or a single or multiple variable focus plane(s). Virtual content having an associated virtual depth plane that lies within the delimited zone may be projected to the user in a normal manner, whereas virtual content outside the delimited zone is modified by a light modifying device so as to reduce the reliability of the accommodation cues.

In some instances, the light modifying device may cause the collimated light generated by a projector to become converging when entering the eyepiece. This causes the virtual image light (i.e., light associated with a virtual image) that is outcoupled from the leaky-grating of the eyepiece to also be converging. However, the chief ray of each beamlet does not change direction, resulting in a virtual image with vergence cues but very weak accommodation cues. Such a virtual image can disrupt the vergence-accommodation response in areas of the depth of field where VAC would exceed the threshold tolerance. Thus, embodiments disclosed herein can extend the depth of field of the optical system, since the user's eye may not be able to focus on pixels at the virtual depth plane. Additionally or alternatively, the light modifying device may reduce the diameter of each collimated pixel beam generated by the projector. This can cause the light that is outcoupled from the leaky-grating of the eyepiece to likewise have pixel beams with reduced diameters, thereby disrupting the accommodation cues associated with the outcoupled light.

In some instances, optical see-through (OST) AR devices can improve virtual content being presented to a user by applying optical power to the virtual image light using one or more lens assemblies arranged within an optical stack. Embodiments of the present invention are compatible with existing systems that utilize lens assemblies to vary the virtual depth plane of the virtual object.

FIG. 1 illustrates an AR scene 100 as viewed through a wearable AR device, according to some embodiments. AR scene 100 is depicted wherein a user of an AR technology sees a real-world park-like setting 106 featuring various real-world objects 130 such as people, trees, buildings in the background, and a real-world concrete platform 120. In addition to these items, the user of the AR technology also perceives that they "see" various virtual objects 102 such as a robot statue 102-2 standing upon the real-world concrete platform 120, and a cartoon-like avatar character 102-1 flying by, which seems to be a personification of a bumble bee, even though these elements (character 102-1 and statue 102-2) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2A:
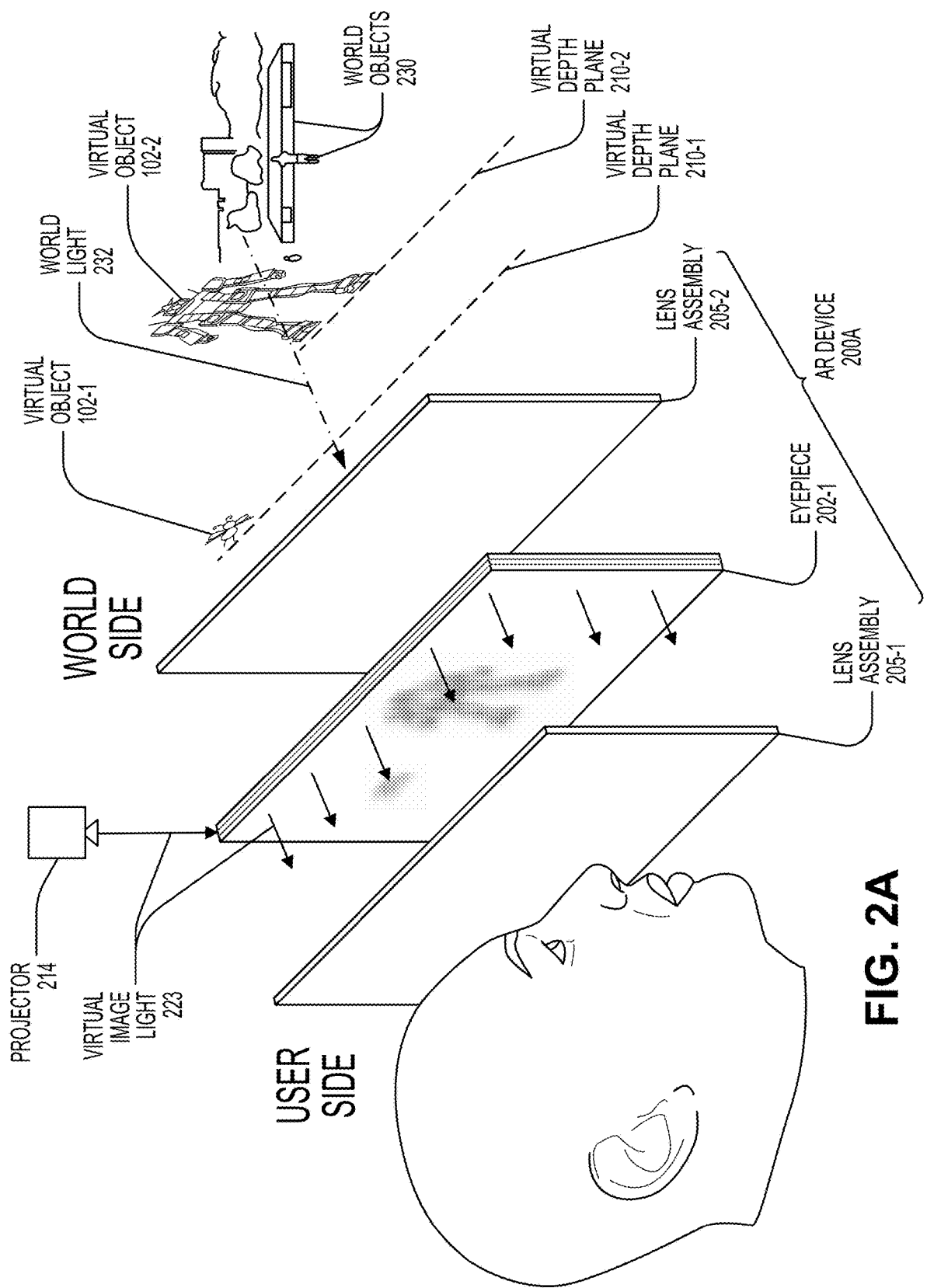
FIG. 2A illustrates an AR device having a single fixed focal plane.

FIG. 2A illustrates an AR device 200A having a single fixed focal plane, according to some embodiments. During operation, a projector 214 of AR device 200A may project virtual image light 223 (i.e., light associated with virtual content) onto an eyepiece 202-1, which may cause a light field (i.e., an angular representation of virtual content) to be projected onto a retina of a user in a manner such that the user perceives the corresponding virtual content as being positioned at some location within the user's environment. For example, virtual image light 223 outcoupled by eyepiece 202-1 may cause the user to perceive character 102-1 as being positioned at a first virtual depth plane 210-1 and statue 102-2 as being positioned at a second virtual depth plane 210-2. The user perceives the virtual content along with world light 232 corresponding to one or more world objects 230, such as platform 120.

In some embodiments, AR device 200A includes a first lens assembly 205-1 positioned on the user side of eyepiece 202-1 (the side of eyepiece 202-1 closest to the eye of the user) and a second lens assembly 205-2 positioned on the world side of eyepiece 202-1. Each of lens assemblies 205-1, 205-2 may be configured to apply optical power to the light passing therethrough.

Figure 2B:
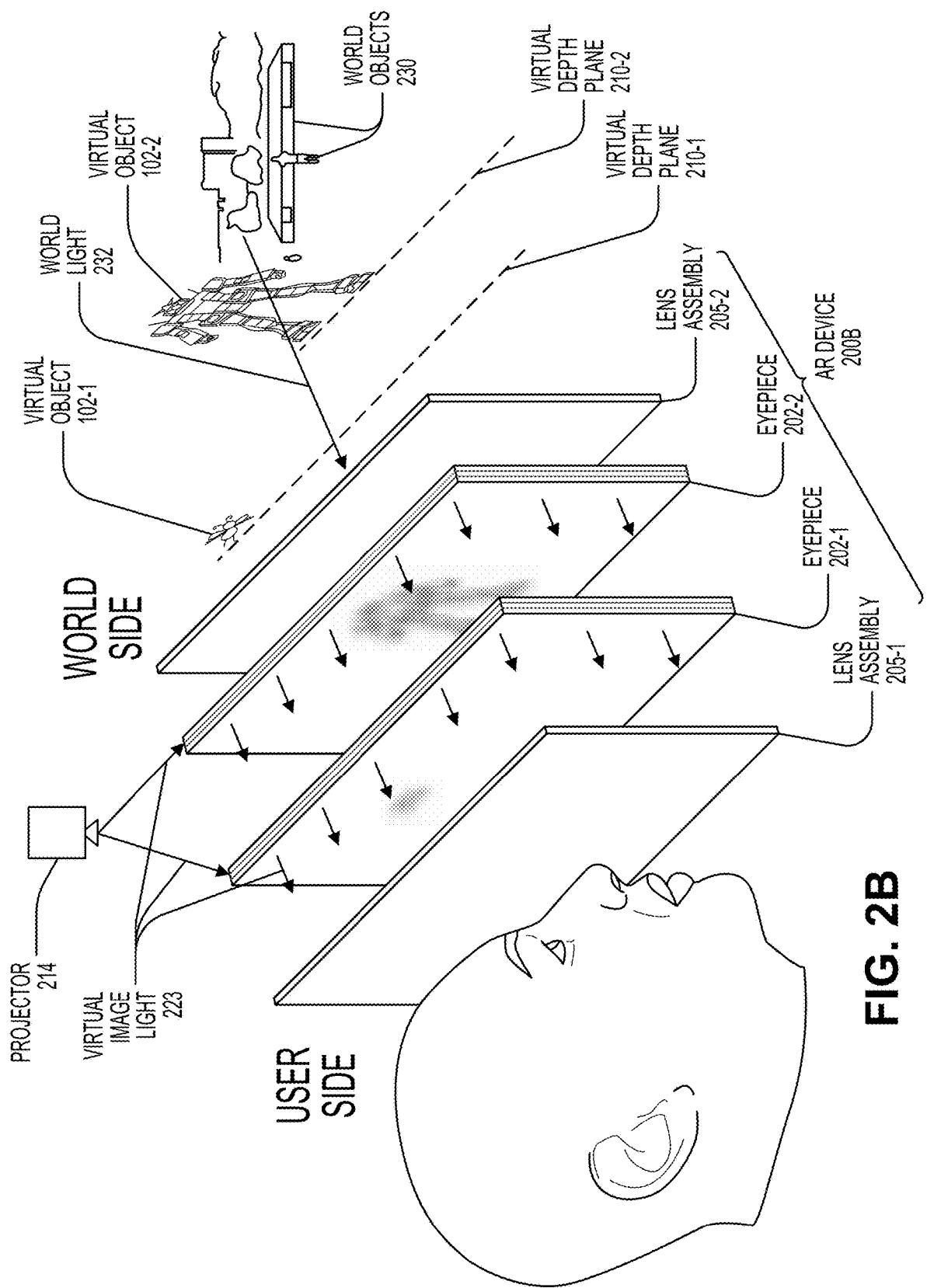
FIG. 2B illustrates an AR device having two fixed focal planes.

FIG. 2B illustrates an AR device 200B having two fixed focal planes, according to some embodiments. During operation, projector 214 may project virtual image light 223 onto first eyepiece 202-1 and a second eyepiece 202-2, which may cause a light field to be projected onto a retina of a user in a manner such that the user perceives the corresponding virtual content as being positioned at some location within an environment of the user. For example, virtual image light 223 outcoupled by first eyepiece 202-1 may cause the user to perceive character 102-1 as being positioned at a first virtual depth plane 210-1 and virtual image light 223 outcoupled by second eyepiece 202-2 may cause the user to perceive statue 102-2 as being positioned at a second virtual depth plane 210-2.

Figure 3:
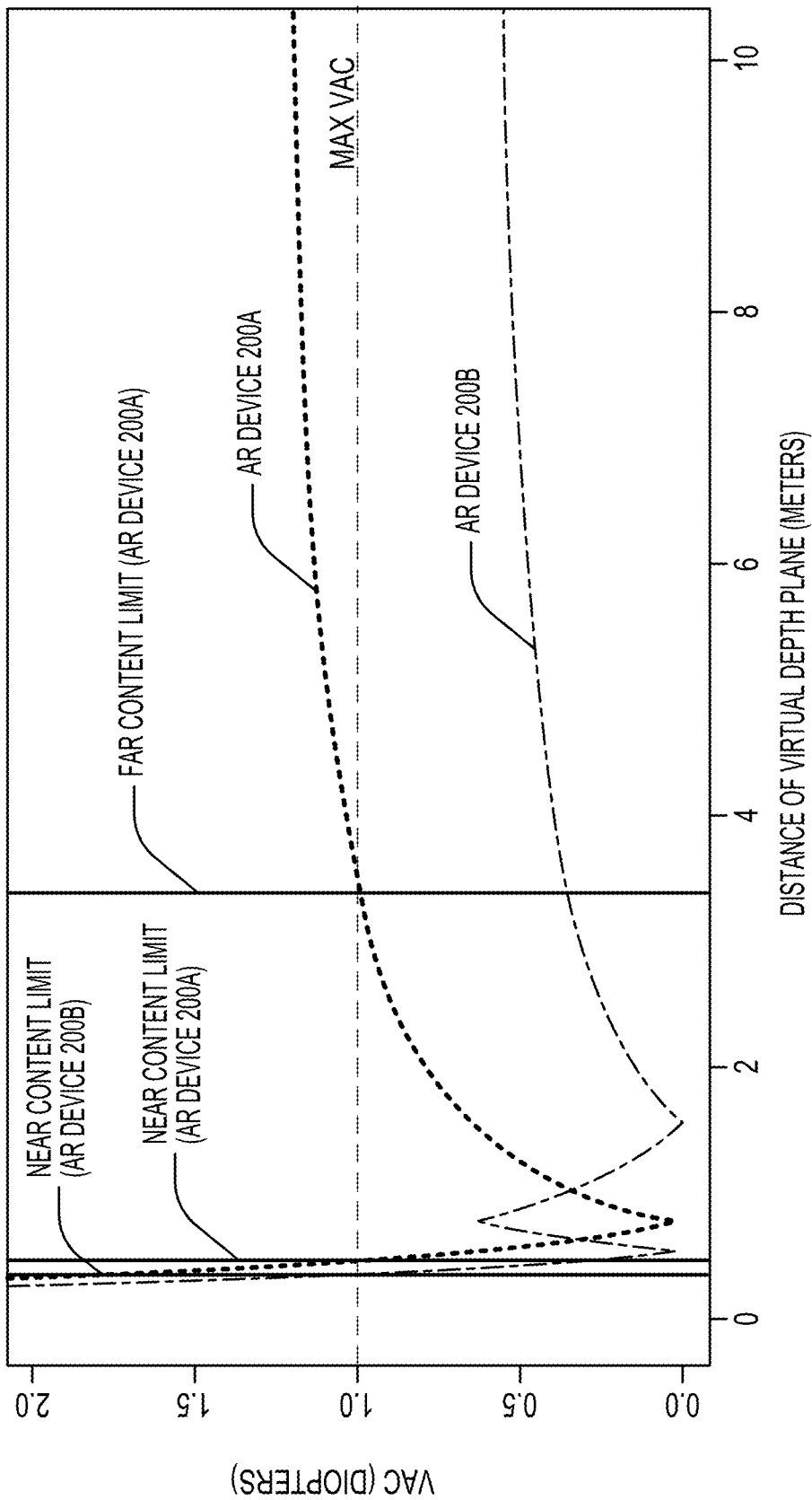
FIG. 3 illustrates the relationship between vergence-accommodation conflict (VAC) and the distance of the virtual depth plane.

FIG. 3 illustrates the relationship between VAC and the distance of the virtual depth plane for each of AR devices 200A, 200B described in reference to FIGS. 2A and 2B, respectively. For AR device 200B, the two-focal plane system provides switchable focal planes at 1.95 diopters (0.51 meters) and 0.65 diopters (1.54 meters), with a switch point at 1.3 diopters (0.77 meters), a near content limit (clipping plane) at 2.7 diopters (0.37 meters), and an ability to provide imagery never exceeding 1.0 diopter VAC between that plane and infinity. For AR device 200A, the single fixed focal plane system has a focal plane location at 1.5 diopters (0.6 meters) and a near content limit of 2.5 diopters (0.4 meters) and a far content limit of 0.31 diopters (3.2 meters), assuming a maximum allowable VAC of 1.0 diopter. Such a configuration would have a usable range of 0.4-3.2 meters with content falling outside of that range requiring some solution to mitigate exceeding the VAC limit.

Figure 4:
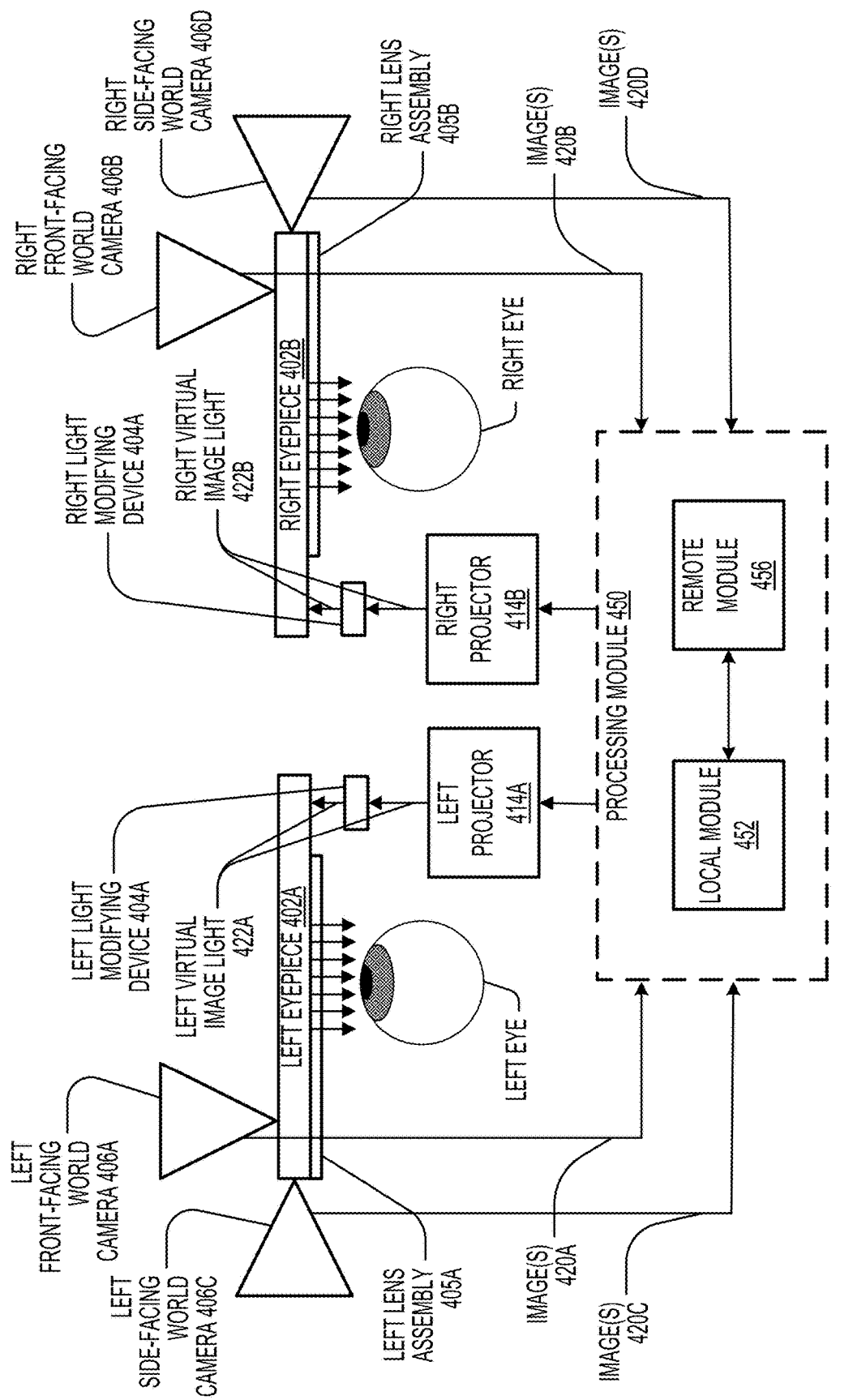
FIG. 4 illustrates a schematic view of an example wearable AR device.

FIG. 4 illustrates a schematic view of an example wearable AR device 400, according to some embodiments of the present invention. AR device 400 may include a left eyepiece 402A and a left lens assembly 405A arranged in a side-by-side configuration and a right eyepiece 402B and a right lens assembly 405B also arranged in a side-by-side configuration. In some embodiments, AR device 400 includes one or more sensors including, but not limited to: a left front-facing world camera 406A attached directly to or near left eyepiece 402A, a right front-facing world camera 406B attached directly to or near right eyepiece 402B, a left side-facing world camera 406C attached directly to or near left eyepiece 402A, and a right side-facing world camera 406D attached directly to or near right eyepiece 402B. In some embodiments, AR device 400 includes one or more image projection devices such as a left projector 414A optically linked to left eyepiece 402A and a right projector 414B optically linked to right eyepiece 402B.

Some or all of the components of AR device 400 may be head mounted such that projected images may be viewed by a user. In one particular implementation, all of the components of AR device 400 shown in FIG. 4 are mounted onto a single device (e.g., a single headset) wearable by a user. In another implementation, one or more components of a processing module 450 are physically separate from and communicatively coupled to the other components of AR device 400 by one or more wired and/or wireless connections. For example, processing module 450 may include a local module 452 on the head mounted portion of AR device 400 and a remote module 456 physically separate from and communicatively linked to local module 452. Remote module 456 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 450 may include a processor and an associated digital memory, such as non-volatile memory (e.g., flash memory), both of which may be utilized to assist in the processing, caching, and storage of data. The data may include data captured from sensors (which may be, e.g., operatively coupled to AR device 400) or otherwise attached to a user, such as cameras 406, an ambient light sensor, eye trackers, microphones, inertial measurement units, accelerometers, compasses, GPS units, radio devices, and/or gyros. For example, processing module 450 may receive image(s) 420 from cameras 406. Specifically, processing module 450 may receive left front image(s) 420A from left front-facing world camera 406A, right front image(s) 420B from right front-facing world camera 406B, left side image(s) 420C from left side-facing world camera 406C, and right side image(s) 420D from right side-facing world camera 406D. In some embodiments, image(s) 420 may include a single image, a pair of images, a video comprising a stream of images, a video comprising a stream of paired images, and the like. Image(s) 420 may be periodically generated and sent to processing module 450 while AR device 400 is powered on, or may be generated in response to an instruction sent by processing module 450 to one or more of the cameras. As another example, processing module 450 may receive ambient light information from an ambient light sensor. As another example, processing module 450 may receive gaze information from one or more eye trackers. As another example, processing module 450 may receive image information (e.g., image brightness values) from one or both of projectors 414.

Cameras 406A, 406B may be positioned to capture images that substantially overlap within the field of view of a user's left and right eyes, respectively. Accordingly, placement of cameras 406 may be near a user's eyes but not so near as to obscure the user's field of view. Alternatively or additionally, cameras 406A, 406B may be positioned so as to align with the incoupling locations of virtual image light 422A, 422B, respectively. Cameras 406C, 406D may be positioned to capture images to the side of a user, e.g., in a user's peripheral vision or outside the user's peripheral vision. Image(s) 420C, 420D captured using cameras 406C, 406D need not necessarily overlap with image(s) 420A, 420B captured using cameras 406A, 406B.

Eyepieces 402A, 402B may comprise transparent or semi-transparent waveguides configured to direct and outcouple light generated by projectors 414A, 414B, respectively. Specifically, processing module 450 may cause left projector 414A to output left virtual image light 422A onto left eyepiece 402A, and may cause right projector 414B to output right virtual image light 422B onto right eyepiece 402B. In some embodiments, each of eyepieces 402A, 402B may comprise a plurality of waveguides corresponding to different colors. In some embodiments, lens assemblies 405A, 405B may be coupled to and/or integrated with eyepieces 402A, 402B. For example, lens assemblies 405A, 405B may be incorporated into a multi-layer eyepiece and may form one or more layers that make up one of eyepieces 402A, 402B.

In some embodiments, AR device 400 includes one or more light modifying devices 404A, 404B for modifying virtual image light 422A, 422B. Specifically, a left light modifying device 404A may be positioned in an optical path between left projector 414A and left eyepiece 402A so as to modify left virtual image light 422A prior to being outputted onto left eyepiece 402A, and a right light modifying device 404B may be positioned in an optical path between right projector 414B and right eyepiece 402B so as to modify right virtual image light 422B prior to being outputted onto right eyepiece 402B. In some embodiments, light modifying devices 404A, 404B may be integrated with projectors 414A, 414B. In some embodiments, light modifying devices 404A, 404B may be integrated with eyepieces 402A, 402B.

In some embodiments, projectors 414A, 414B may include a micro-electromechanical system (MEMS) spatial light modulator (SLM) scanning device. In such embodiments, light modifying devices 404A, 404B may employ a varifocal mirror or lens that can be used in the laser beams prior to the scanning mirrors. If a relay optical system is used, one of the optical elements within the relay optics could be vari-focal and be switched to provide converging pixel rays to the ICG formed on the eyepieces. If a standard projection system is used with a pixel-based SLM (such as a liquid crystal on silicon (LCOS)), the SLM itself could be translated in the z-axis (perpendicular to the array), such that the projection lens produces a finite external focal plane (and thus convergent pixel rays). In some embodiments, a varifocal lens could be incorporated between the projection/relay lens of the microdisplay and the ICG of the eyepiece itself, converting the output collimated pixel rays into convergent states.

Figure 5:
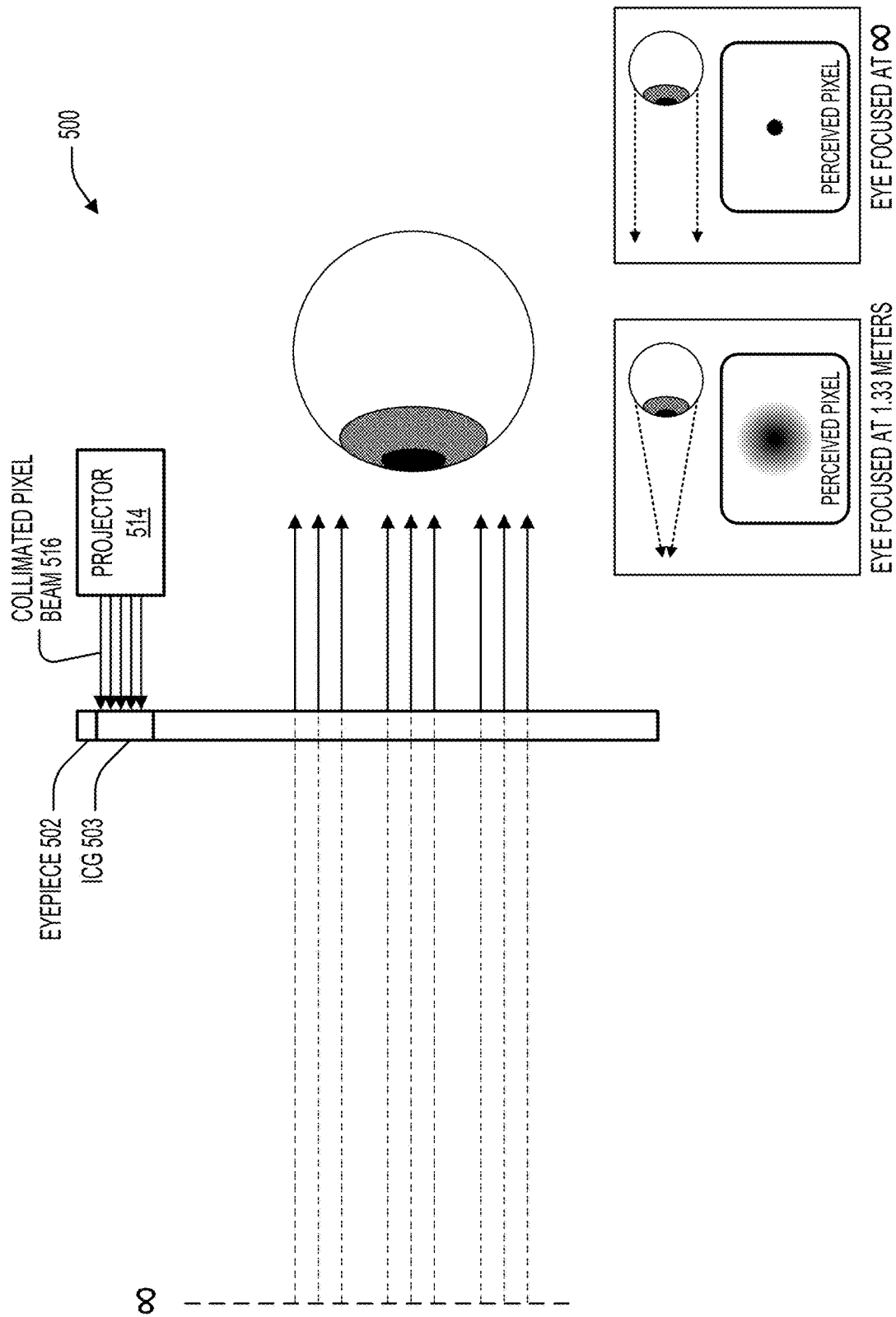
FIG. 5 illustrates an example function of a viewing optics assembly of an AR device and the resulting user visual percept of the system's output.

FIG. 5 illustrates an example function of a viewing optics assembly 500 of an AR device and the resulting user visual percept of the system's output. Viewing optics assembly 500 includes a projector 514 and an eyepiece 502. Projector 514 generates a collimated pixel beam 516 that is carried onto an eyepiece 502 at an input coupling grating (ICG) 503 formed on eyepiece 502. After being diffracted by ICG 503, collimated pixel beam 516 propagates in eyepiece 502 until an output grating formed on eyepiece 502 diffracts the light toward the user.

A leaky-grating light-guide, pupil-expanding eyepiece with no programmed optical power produces a virtual image at infinity. The percept is produced by multiple output "beamlets" (emitted replicants of the input pixel wavefronts) collected through the pupil and imaged onto the retina of the user's eye. In this case, when the user's eye is focused at infinity, a sharp image of the pixel is formed on the retina. When the eye is focused at another plane (for example at 1.33 meters from the user) a blurry image of the pixel is formed on the retina.

Figure 6:
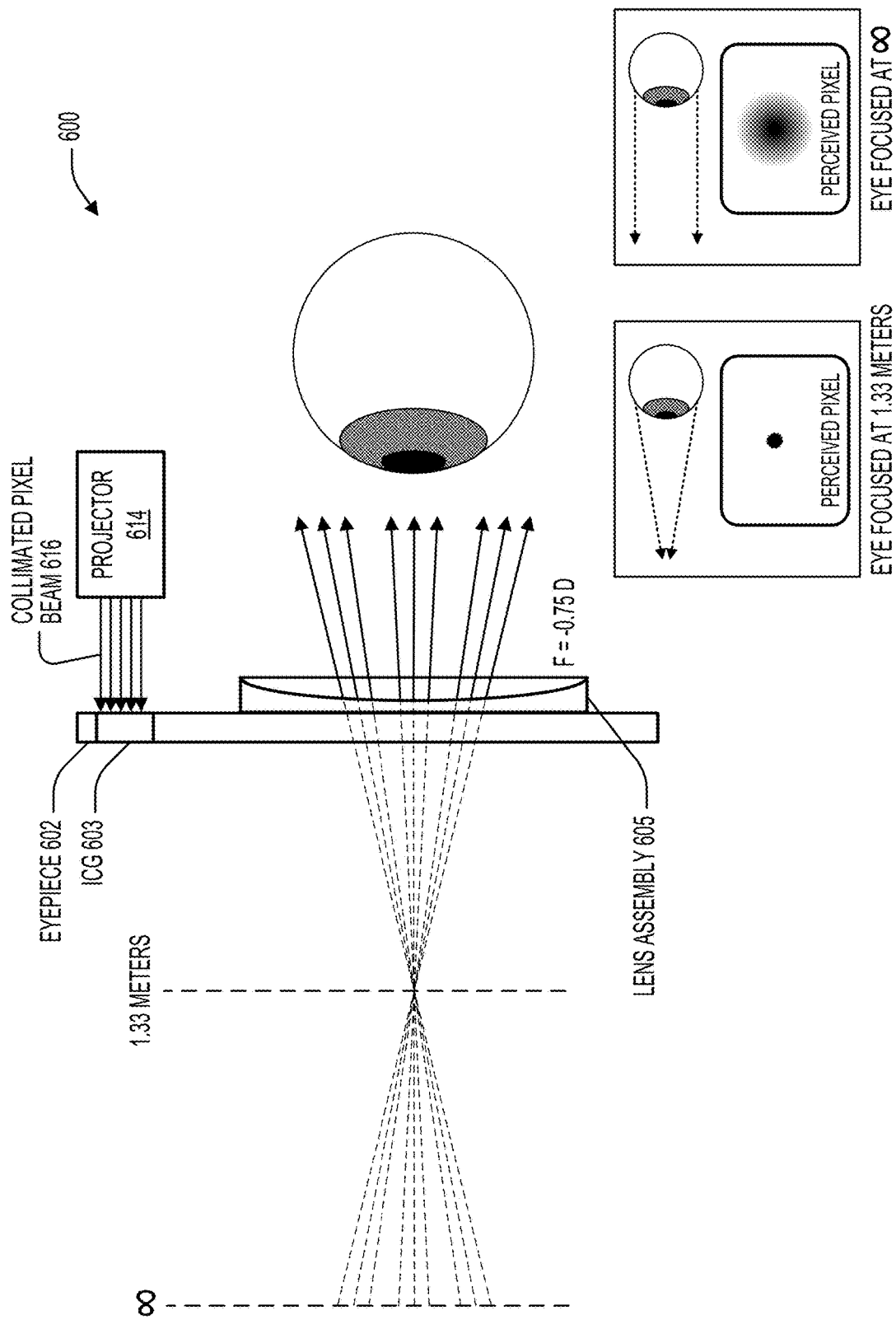
FIG. 6 illustrates an example function of a viewing optics assembly of an AR device and the resulting user visual percept of the system's output.

FIG. 6 illustrates an example function of a viewing optics assembly 600 of an AR device and the resulting user visual percept of the system's output. Viewing optics assembly 600 includes a projector 614 that generates a collimated pixel beam 616 that is carried onto an eyepiece 602 at an ICG 603 formed on eyepiece 602. After being diffracted by ICG 603, collimated pixel beam 616 propagates in eyepiece 602 until an output grating formed on eyepiece 602 diffracts the light toward the user.

Viewing optics assembly 600 includes a −0.75 diopters lens assembly 605 that modulates the wavefronts of the emitted beamlets, diverging them with respect to each other and diverging each ray independently, so as to both focus pixel light and converge beamlets at 1.33 meters from the user's eye. Lens assembly 605 shifts the chief rays of the emerging beamlets and diverges the collimated output to a single pixel focus position at the focal length of the lens. In this case, when the user's eye is focused at 1.33 meters, a sharp image of the pixel is formed on the retina. When the eye focuses at infinity, that image is blurred.

In the example illustrated in FIG. 6, the depth of focus of the image is determined by several factors, including the beamlet packing density (determined by the beam diameter, the eyepiece substrate thickness, along with several other factors), the size of the user's pupil, the optical quality of the lens assembly 605, and the inherent depth of field of the user's eye. Each of these factors may be considered to determine an acceptable VAC budget figure for the system. In some embodiments, 1.0 diopters can be used as the VAC budget figure, although this value can be higher or lower in practice.

Figure 7:
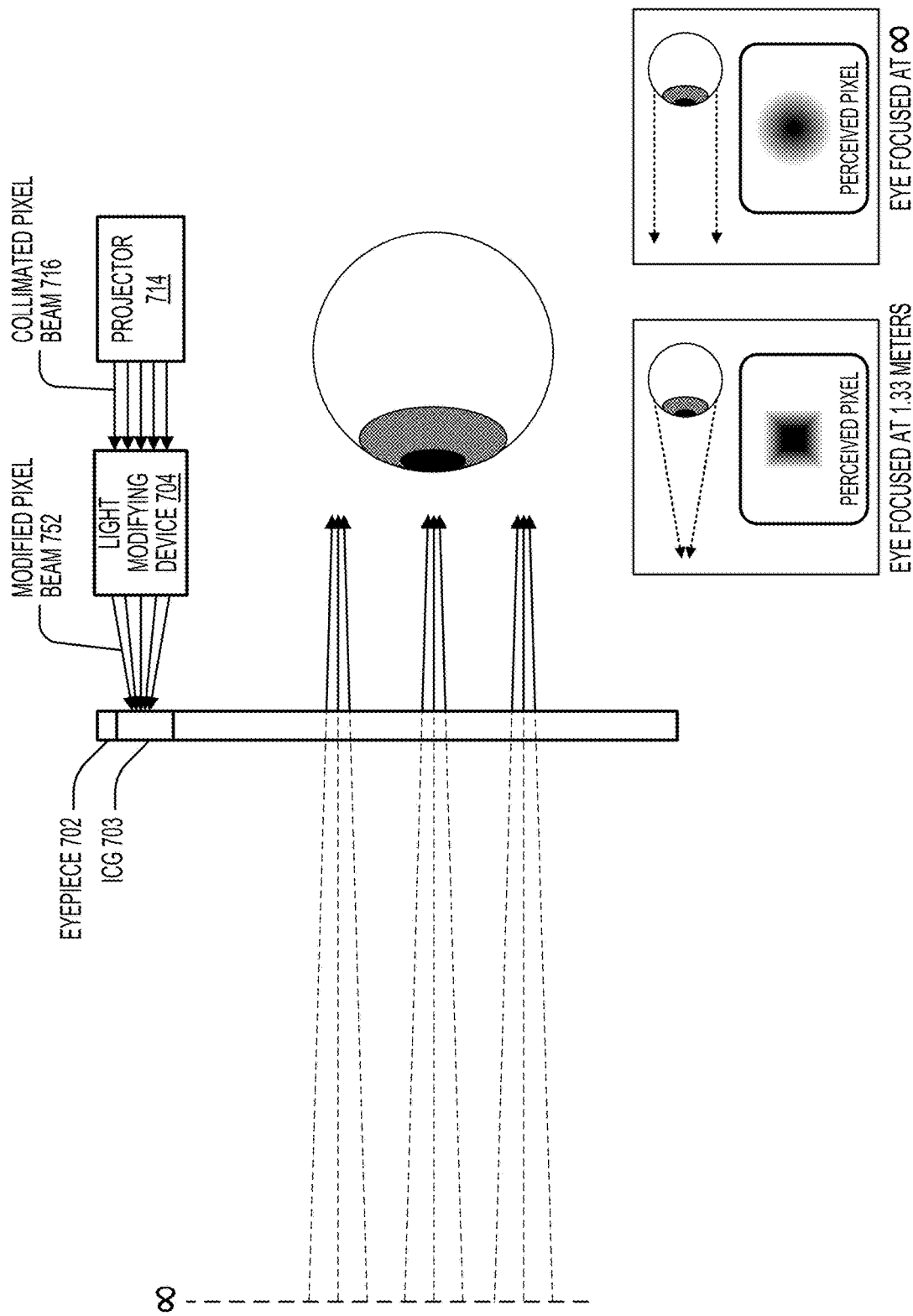
FIG. 7 illustrates an example function of a viewing optics assembly of an AR device and the resulting user visual percept of the system's output.

FIG. 7 illustrates an example function of a viewing optics assembly 700 of an AR device and the resulting user visual percept of the system's output. Viewing optics assembly 700 includes a projector 714 that generates a collimated pixel beam 716 that is modified by a light modifying device 704 to produce a modified pixel beam 752 having a converging wavefront. Modified pixel beam 752 is carried onto an eyepiece 702 at an ICG 703 formed on eyepiece 702. After being diffracted by ICG 703, modified pixel beam 752 propagates in eyepiece 702 until an output grating formed on eyepiece 702 diffracts the light toward the user.

In the example illustrated in FIG. 7, modifying the wavefronts of the imaged pixels introduces optical power to the projection system, transforming an infinity-focused system into a system that produces a finite image position in front of the projector. In such a configuration, a single pixel produces a converging (curved) wavefront at the pupil plane of the projector. When a converging pixel ray enters the eyepiece, the exiting beamlets maintain this convergence, however, the chief ray of each beamlet does not change direction. In this case, when the user's eye is focused either at 1.33 meters or at infinity, a blurred image of the pixel is formed on the retina. Additionally, the perceived pixel when the user's eye is focused at 1.33 meters may be different from the perceived pixel when the user's eye is focused at infinity, as depicted by different types of blur in FIG. 7.

Figure 8:
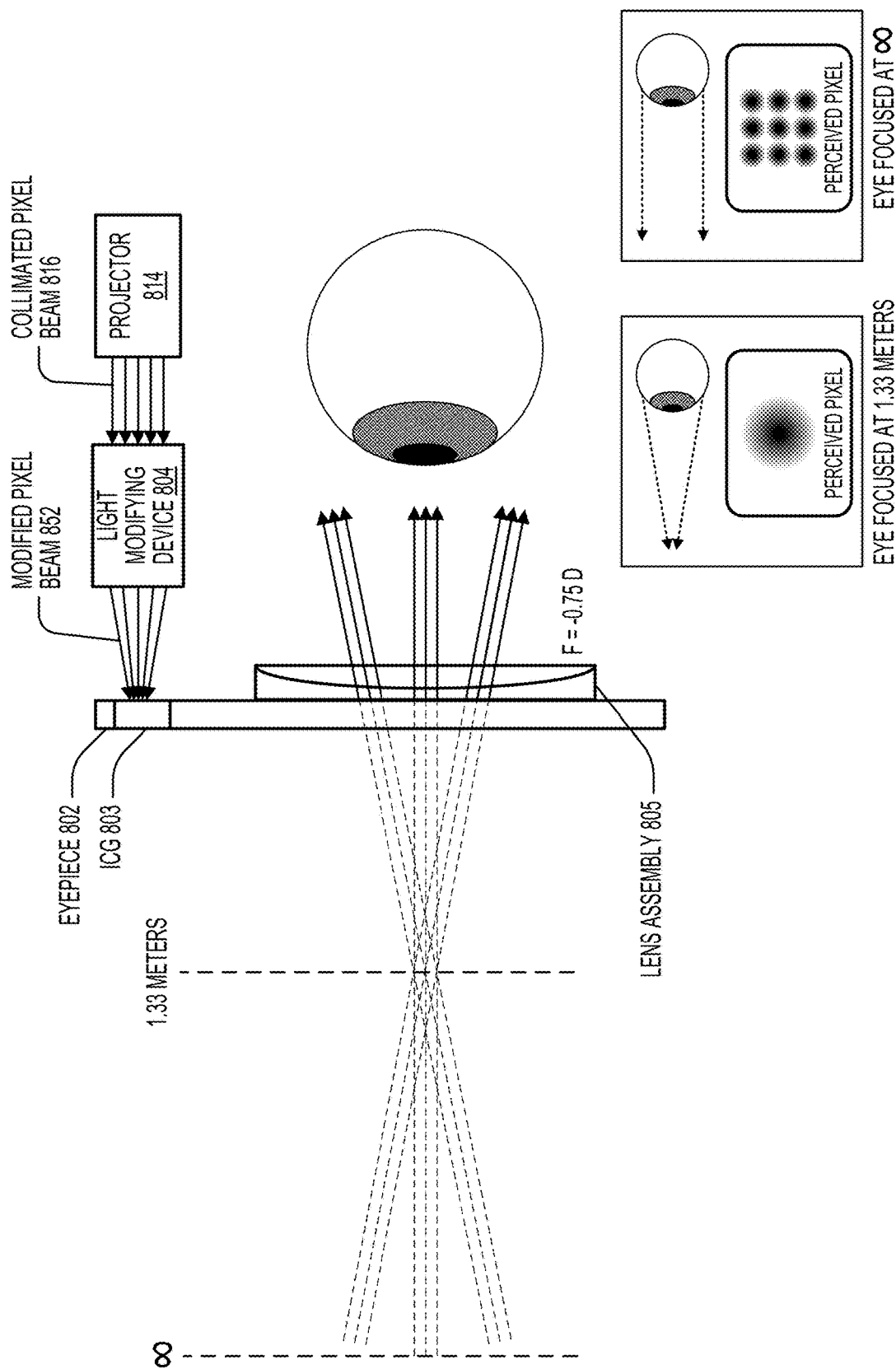
FIG. 8 illustrates an example function of a viewing optics assembly of an AR device and the resulting user visual percept of the system's output.

FIG. 8 illustrates an example function of a viewing optics assembly 800 of an AR device and the resulting user visual percept of the system's output. Viewing optics assembly 800 includes a projector 814 that generates a collimated pixel beam 816 that is modified by a light modifying device 804 to produce a modified pixel beam 852 having a converging wavefront. Modified pixel beam 852 is carried onto an eyepiece 802 at an ICG 803 formed on eyepiece 802. After being diffracted by ICG 803, modified pixel beam 852 propagates in eyepiece 802 until an output grating formed on eyepiece 802 diffracts the light toward the user. Viewing optics assembly 800 further includes a −0.75 diopters lens assembly 805 positioned between eyepiece 802 and the user's eye that modulates the wavefronts of the emitted beamlets.

In the example illustrated in FIG. 8, lens assembly 805 collimates each beamlet output while simultaneously re-directing the chief ray of each beamlet to pivot around a point at the focal plane of the lens. As a result, when the user's eye is focused at 1.33 meters, a blurred image of the pixel is formed on the retina. When the user's eye is focused at infinity, a percept comprising a repeated structure of blurred images is produced. The user's eye is unable to bring the blurred image into focus, thereby disrupting the user's physiological vergence-accommodation cues and reducing the uncomfortable effects of vergence-accommodation conflict. This percept having a repeated structure allows virtual content to exist on planes outside of the VAC threshold. As a result, the depth of field of the optical system can extend beyond the VAC threshold without discomfort, since the user's eye will not be able to focus on pixels at the virtual depth plane.

Figure 9:
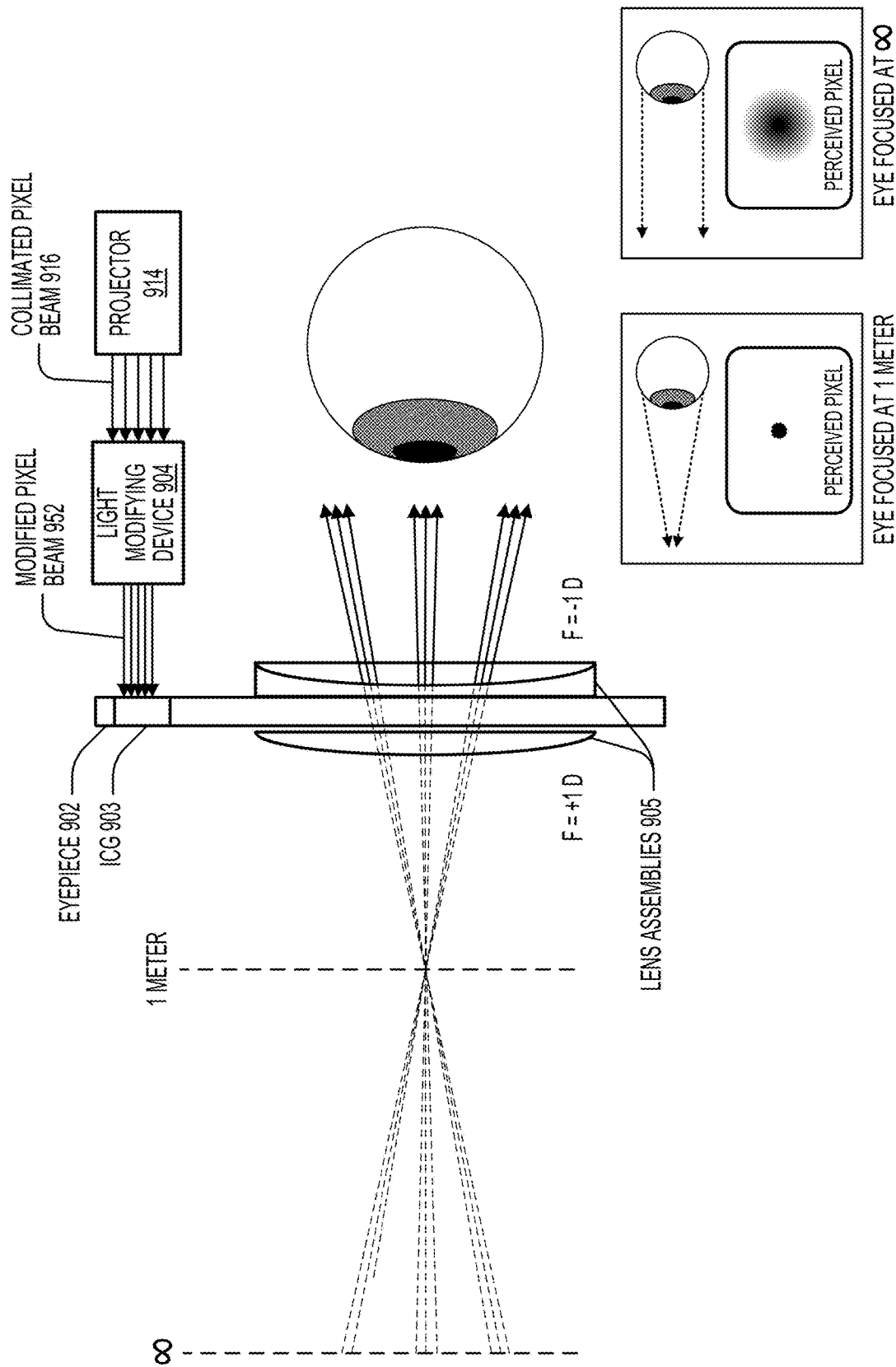
FIG. 9 illustrates an example function of a viewing optics assembly of an AR device and the resulting user visual percept of the system's output.

FIG. 9 illustrates an example function of a viewing optics assembly 900 of an AR device and the resulting user visual percept of the system's output. Viewing optics assembly 900 includes a projector 914 that generates a collimated pixel beam 916 that is modified by a light modifying device 904 such as a spatial light modulator (SLM), relay optics, polarizers, beam splitters, lenses or a combination thereof, to produce a modified pixel beam 952 having a reduced diameter. Modified pixel beam 952 is carried onto an eyepiece 902 at an ICG 903 formed on eyepiece 902. After being diffracted by ICG 903, modified pixel beam 952 propagates in eyepiece 902 until an output grating formed on eyepiece 902 diffracts the light toward the user. Viewing optics assembly 900 further includes lens assemblies 905 including a −1 diopter component positioned between eyepiece 902 and the user's eye and a +1 diopter component positioned on the world side of eyepiece 902.

In the example illustrated in FIG. 9, vergence-accommodation cues are disrupted and the depth of field of the system is extended by modulating the diameter of the laser beam, rather than through divergence/convergence of the image light. This may be performed by light modifying device 904 prior to injecting the light into ICG 903. In this case, the percept is driven by the inability of the lens assembly between eyepiece 902 and the user's eye to provide a small focal spot due to the reduced size of the pixel beam.

Figure 10A:
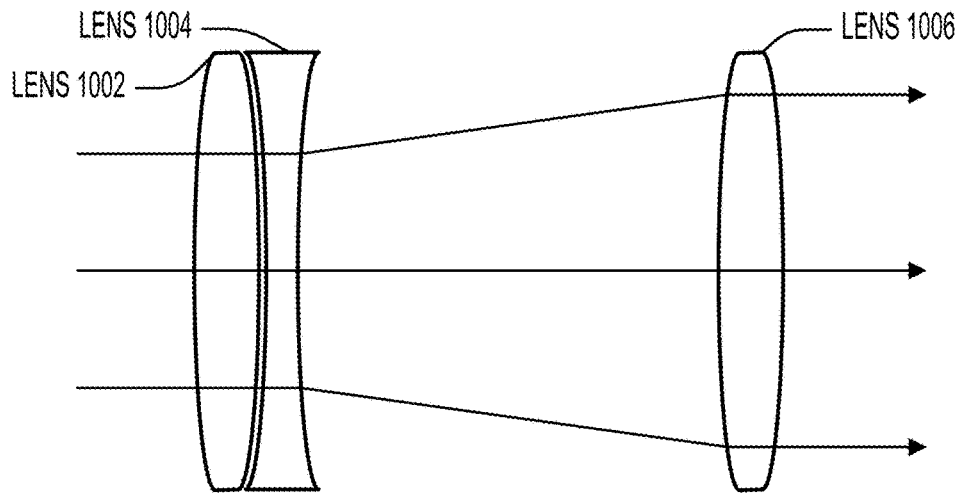
FIGS. 10A-10C illustrate an example light modifying device for reducing the diameter of the collimated pixel beam.
Figure 10B:
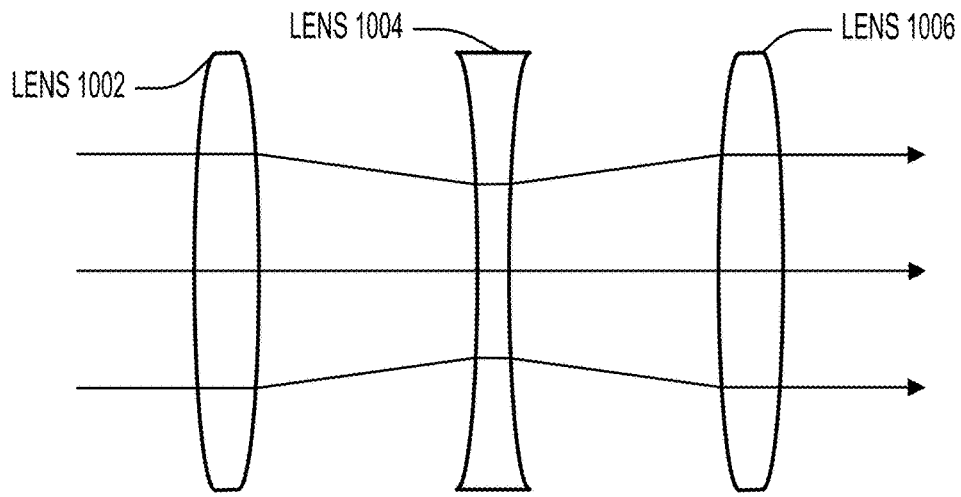
Figure 10C:
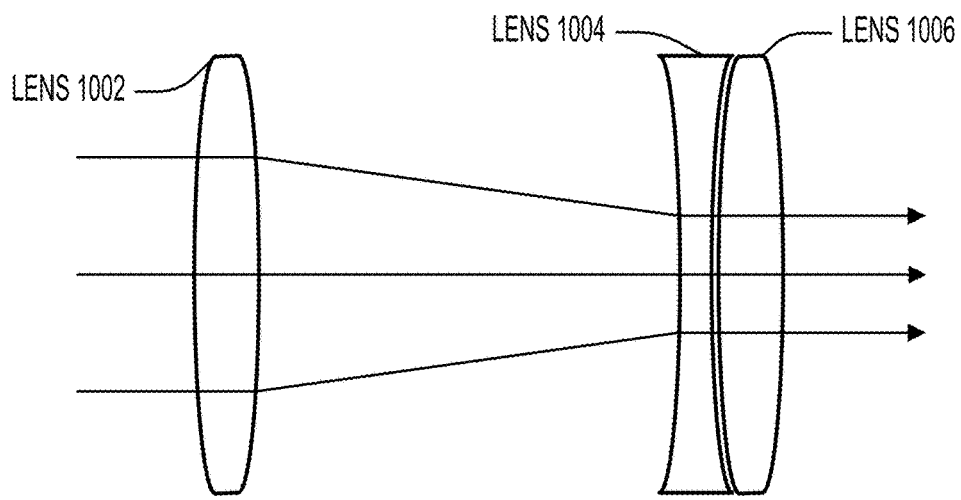

FIGS. 10A-10C illustrate an example light modifying device for reducing the diameter of the collimated pixel beam, according to some embodiments of the present invention. By varying the position of a second lens 1004 relative to a first lens 1002 and a third lens 1006, the diameter of the input collimated pixel beam can be expanded, reduced, or left unmodified. In reference to FIG. 10A, second lens 1004 is adjusted to be positioned closer to first lens 1002 than to third lens 1006 (e.g., adjacent to first lens 1002), causing the diameter of the collimated pixel beam to become expanded upon exiting the light modifying device. In reference to FIG. 10B, second lens 1004 is adjusted to be positioned at a midpoint between first lens 1002 and third lens 1006, causing the diameter of the collimated pixel beam to be left unmodified upon exiting the light modifying device. In reference to FIG. 10C, second lens 1004 is adjusted to be positioned closer to third lens 1006 than to first lens 1002 (e.g., adjacent to third lens 1006), causing the diameter of the collimated pixel beam to become reduced upon exiting the light modifying device.

In some embodiments, the light modifying device illustrated in FIGS. 10A-10C is used to dynamically change the diameter of a MEMs laser beam. In some instances, the light modifying device may be positioned prior to the MEMs mirror(s) so as to modify the laser beam prior to entering the MEMs mirror(s).

Figure 11:
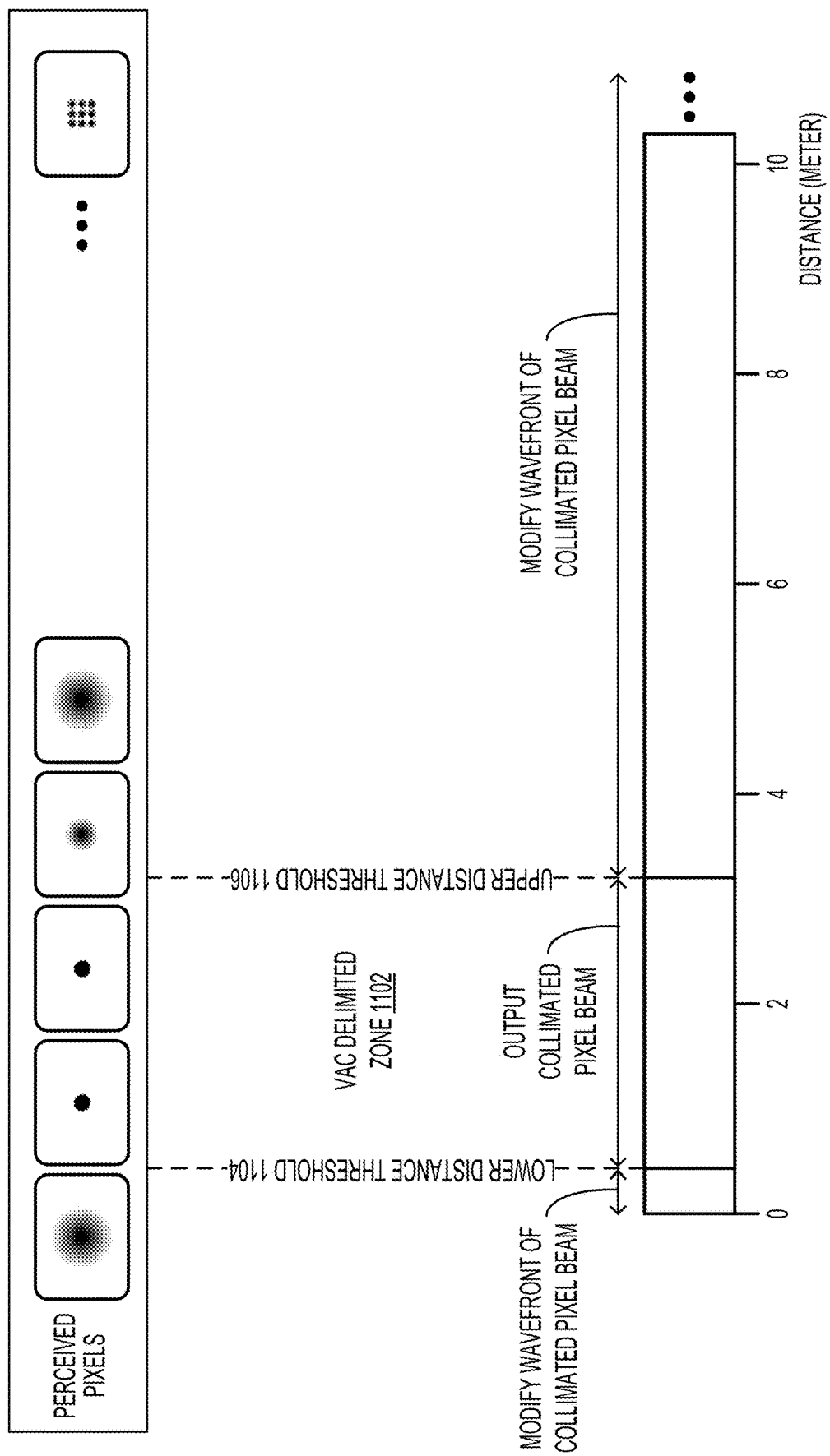
FIG. 11 illustrates an example control scheme for a light modifying device and the corresponding user visual percept of the system's output.

FIG. 11 illustrates an example control scheme for a light modifying device and the corresponding user visual percept of the system's output, according to some embodiments of the present invention. In some embodiments, a VAC delimited zone 1102 is defined based on a desired VAC limit, such as 1 diopter. VAC delimited zone 1102 may include a lower distance threshold 1104, below which the VAC experienced by a user exceeds the VAC limit, and an upper distance threshold 1106, above which the VAC experienced by a user exceeds the VAC limit.

Under the control scheme, when it is determined that the distance of the virtual depth plane (from the AR device or user) is less than lower distance threshold 1104, the light modifying device is caused to modify the wavefront of the collimated pixel beam. When it is determined that the distance of the virtual depth plane is greater than lower distance threshold 1104 and less than upper distance threshold 1106 (i.e., is within VAC delimited zone 1102), the light modifying device is caused to not modify the collimated pixel beam and to output the collimated pixel beam without modification. When it is determined that the distance of the virtual depth plane is greater than upper distance threshold 1106, the light modifying device is caused to modify the wavefront of the collimated pixel beam.

The control scheme may optionally implement gradual modifications to the collimated pixel beam at or near the distance thresholds. For example, the light modifying device may impart partial modifications to the collimated pixel beam for virtual distances just before a distance threshold, greater modifications at the distance threshold, and full modifications well past the distance threshold. As one example, for an upper distance threshold of 3.2 meters, a control scheme may be implemented in which the collimated pixel beam is converged at 0% for a virtual distance of 2.8 meters, 25% for a virtual distance of 3.0 meters, 50% for a virtual distance of 3.2 meters, 75% for a virtual distance of 3.4 meters, and 100% for a virtual distance of 3.6 meters. In the same or a different example, for a lower distance threshold of 0.4 meters, a control scheme may be implemented in which the collimated pixel beam is converged at 0% for a virtual distance of 0.6 meters, 25% for a virtual distance of 0.5 meters, 50% for a virtual distance of 0.4 meters, 75% for a virtual distance of 0.3 meters, and 100% for a virtual distance of 0.2 meters. Control schemes with longer or shorter transition bands than the above examples may be implemented. One of ordinary skill in the art will see various variations, alternatives, and modifications.

Figure 12:
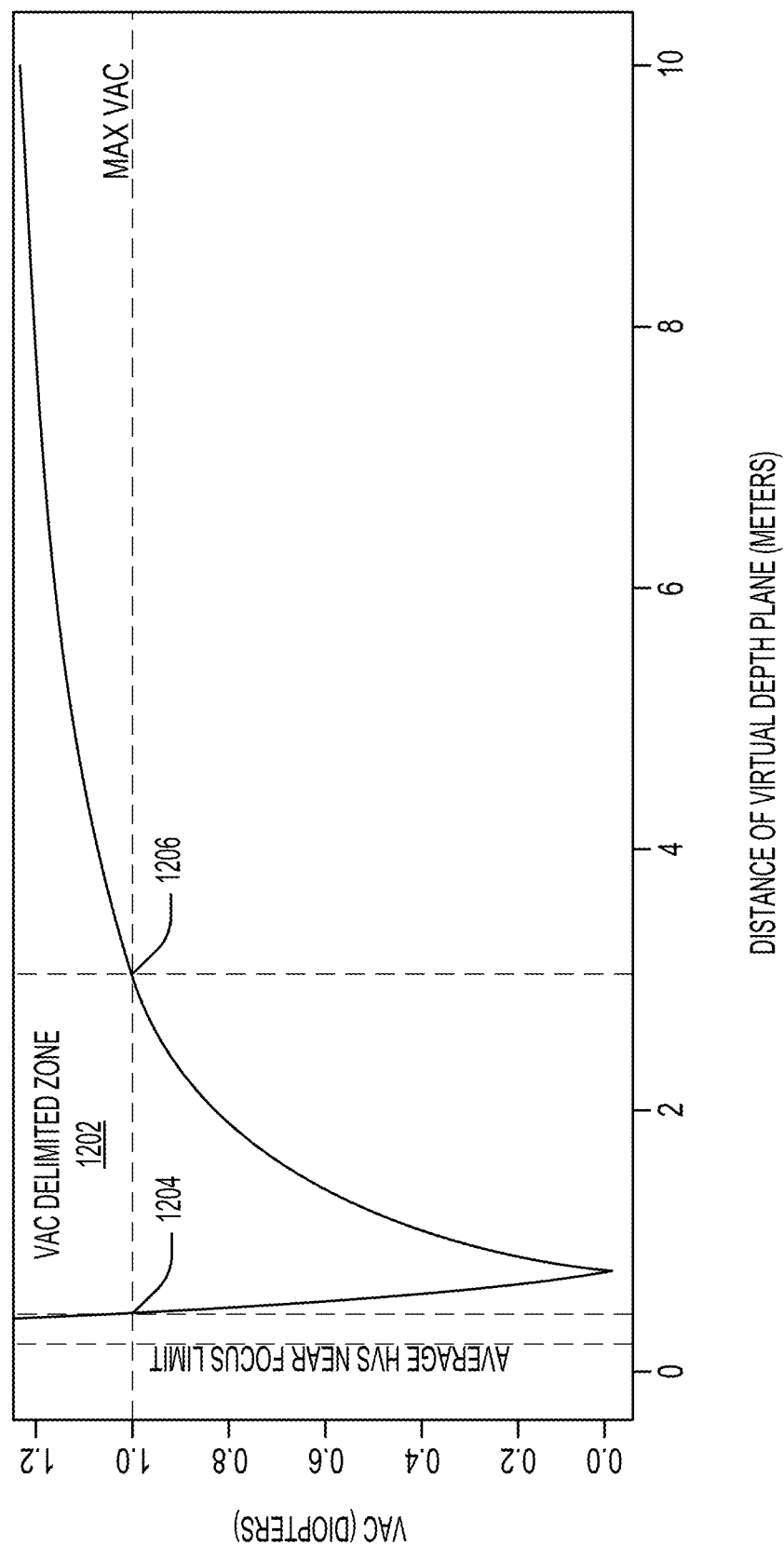
FIG. 12 illustrates an example method for defining a VAC delimited zone.

FIG. 12 illustrates an example method for defining a VAC delimited zone 1202, according to some embodiments of the present invention. First, the VAC experienced by a user is plotted as a function of the distance of the virtual depth plane from the AR device (alternatively referred to as the "VAC plot"). In some embodiments, the VAC plot is determined based on the focal plane design of the AR device. For the VAC plot illustrated in FIG. 12, a 0.75 meters focal plane is utilized. Next, the VAC limit is plotted alongside the VAC experienced by the user. Next, intersection points 1204, 1206 between the two plots are identified and the corresponding distances are used as lower and upper distance thresholds of VAC zone 1202, respectively.

Figure 13:
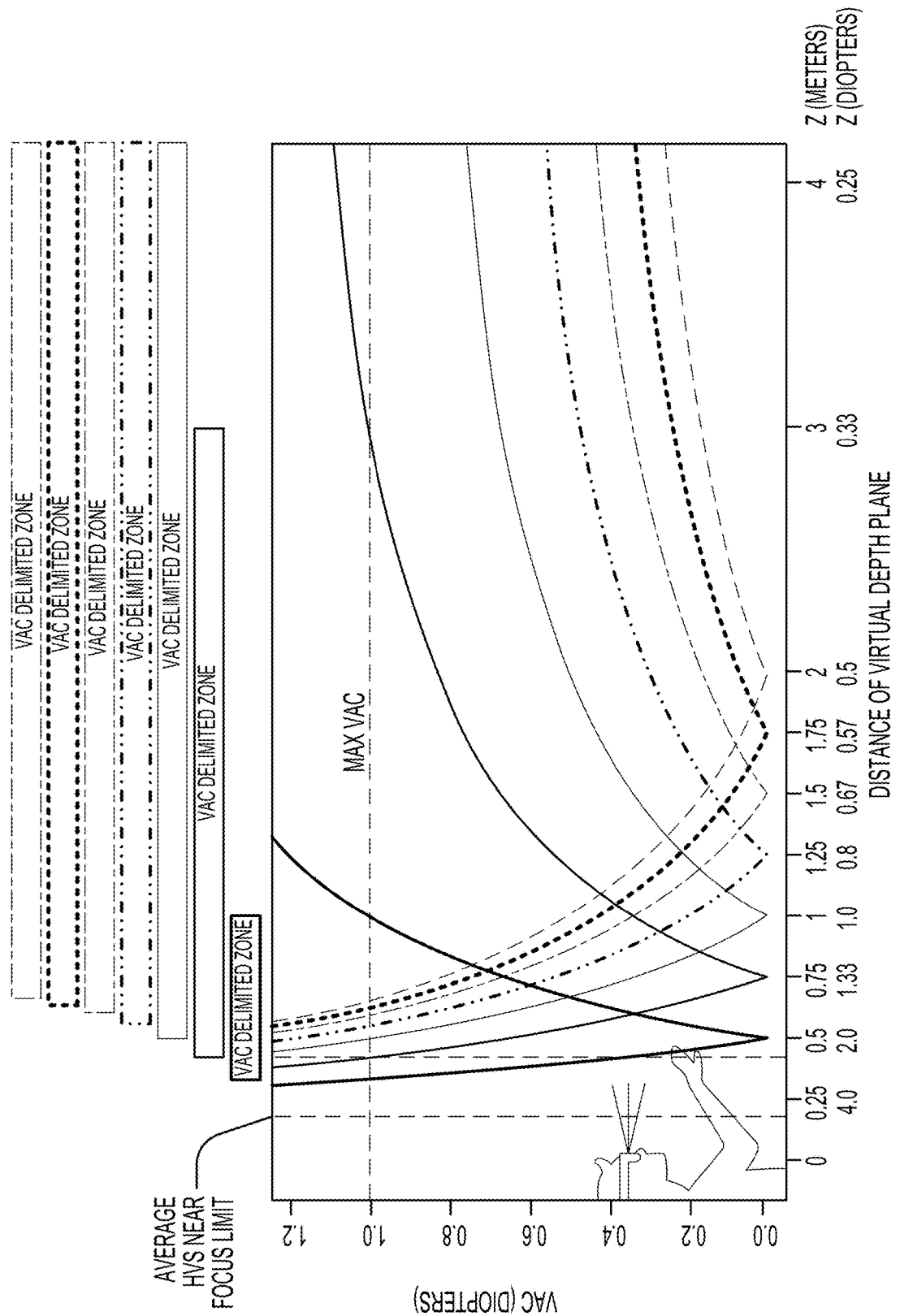
FIG. 13 illustrates various examples of VAC delimited zones.

FIG. 13 illustrates various examples of VAC delimited zones that may be defined based on VAC plots for various single focal plane systems. As the focal plane of the AR device increases, both the lower distance threshold and the upper distance threshold of the VAC delimited zone increase, presenting a trade-off between near-field versus far-field performance. Additional depth planes can be added to the system to increase the VAC delimited zone.

Figure 14:
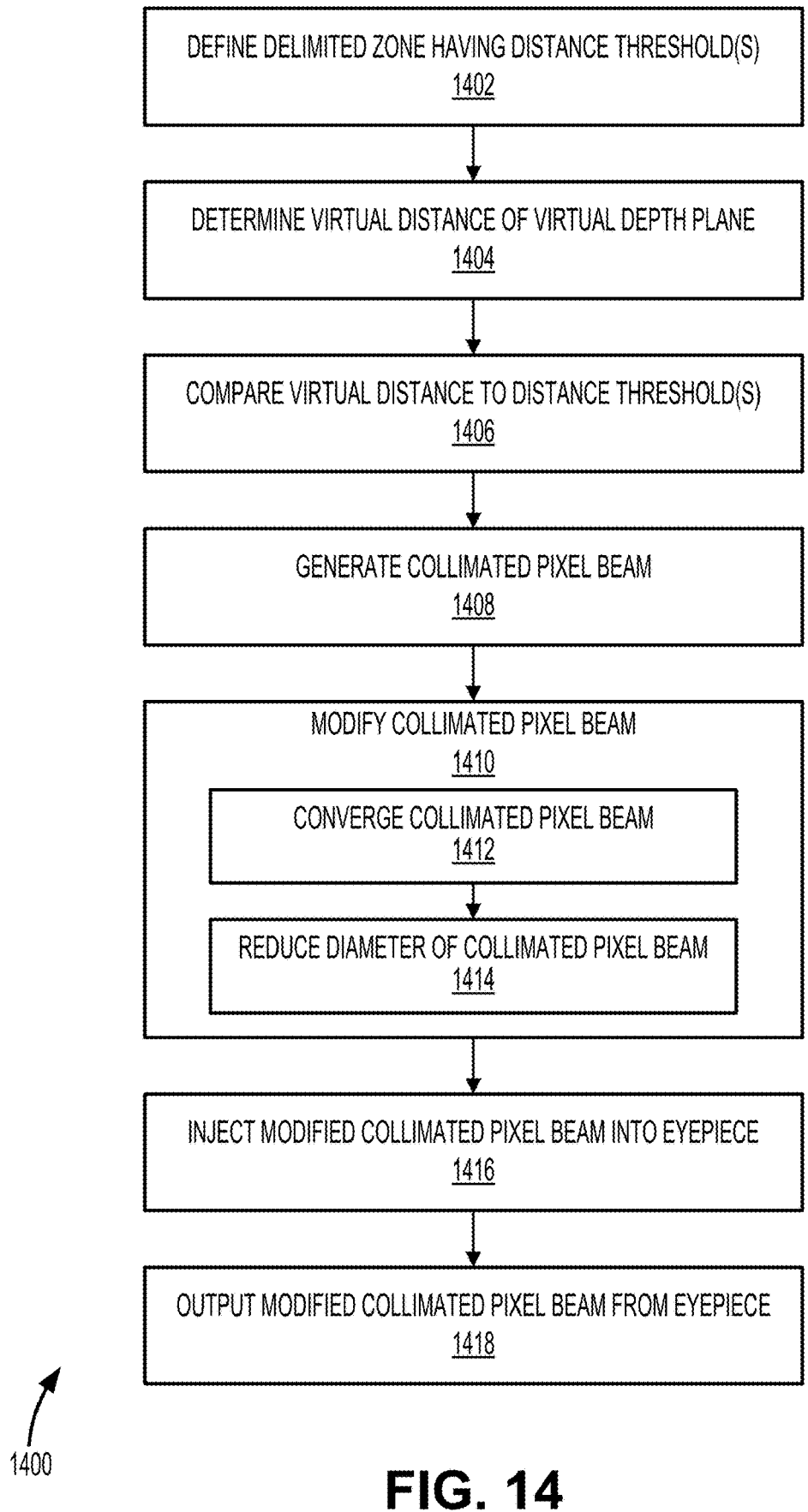
FIG. 14 illustrates an example method of operating an optical system.

FIG. 14 illustrates an example method 1400 of operating an optical system (e.g., AR device 400), according to some embodiments of the present invention. One or more steps of method 1400 may be performed in a different order than the illustrated embodiment, and one or more steps of method 1400 may be omitted during performance of method 1400. Furthermore, two or more steps of method 1400 may be performed simultaneously or concurrently with each other.

At step 1402, a VAC delimited zone (e.g., VAC delimited zones 1102, 1202) is defined. In some embodiments, the VAC delimited zone is defined based on the number of focal planes of the optical device and/or their corresponding focal plane locations. For example, the VAC associated with a single focal plane system with a focal plane location at 1.5 diopters can be estimated and used to determine the VAC delimited zone, which may be significantly smaller than the VAC delimited zone determined using the VAC associated with a multiple focal plane system, such as, for example, a two-focal plane system with focal plane locations at 1.95 diopters and 0.65 diopters. In some embodiments, the VAC delimited zone is additionally (or alternatively) defined based on a VAC limit, which may be specified by a user or may be predetermined for the system. In some embodiments, the VAC delimited zone is defined by finding the intersection point(s) (e.g., intersection points 1204, 1206) between the VAC associated with the optical system and the VAC limit, as described at least in reference to FIGS. 3, 12, and 13.

In some embodiments, the VAC delimited zone is defined as a function of distance from the optical system, where distances inside the VAC delimited zone correspond to virtual depth planes at which virtual content causes a user to experience VAC less than the VAC limit, and distances outside the VAC delimited zone correspond to virtual depth planes at which virtual content causes a user to experience VAC greater than the VAC limit. In some embodiments, the VAC delimited zone includes at least one distance threshold. For example, the VAC delimited zone may include a lower distance threshold (e.g., lower distance threshold 1104) and/or an upper distance threshold (e.g., upper distance threshold 1106), the lower distance threshold being less than the upper distance threshold.

At step 1404, a virtual distance of a virtual depth plane (e.g., virtual depth planes 210) from the optical system at which a virtual object (e.g., virtual objects 102) is to be displayed is determined. The virtual distance may be expressed in meters, diopters, or some other unit that indicates physical displacement. In some embodiments, the virtual distance is determined by a processing module (e.g., processing module 450). In some embodiments, the virtual distance is determined prior to, during, or after the collimated pixel beam associated with the virtual object is generated by the optical system.

At step 1406, the virtual distance is compared to the lower distance threshold and/or the upper distance threshold. In some embodiments, it is determined whether the virtual distance is less than the lower distance threshold, greater than the lower distance threshold and less than the upper distance threshold, or greater than the upper distance threshold. For example, in some embodiments, step 1406 may include determining whether the virtual distance is less than the lower distance threshold. As another example, in some embodiments, step 1406 may include determining whether the virtual distance is greater than the upper distance threshold. As another example, in some embodiments, step 1406 may include determining whether the virtual distance is less than the lower distance threshold or greater than the upper distance threshold. In some embodiments, step 1406 is equivalent to determining whether the virtual distance is outside the VAC delimited zone.

At step 1408, a collimated pixel beam (e.g., collimated pixel beams 516, 616, 716, 816, 916) associated with the virtual object is generated by the optical system. In some embodiments, the collimated pixel beam is generated by a projector (e.g., projectors 214, 414, 514, 614, 714, 814, 914) of the optical system. The collimated pixel beam may contain color, brightness, and size information for displaying the virtual object. For example, the collimated pixel beam may include light from a single LED color source (e.g., red) or from multiple LED color sources (e.g., red, green, and blue).

At step 1410, the collimated pixel beam is modified to generate a modified pixel beam (e.g., modified pixel beams 752, 852, 952). In some embodiments, the collimated pixel beam is modified by a light modifying device (e.g., light modifying devices 404, 704, 804, 904) of the optical system. In some embodiments, whether or not step 1410 is performed may depend on the comparison performed in step 1406. For example, in some embodiments, step 1410 is performed only when it is determined that the virtual distance is outside the VAC delimited zone. For example, step 1410 may only be performed in response to determining that the virtual distance is less than the lower distance threshold or in response to determining that the virtual distance is greater than the upper distance threshold. In some embodiments, the light modifying device is integrated with the projector. In some embodiments, the light modifying device is separate from the projector.

In some embodiments, step 1410 includes step 1412 and/or step 1414. At step 1412, the collimated pixel beam is converged. In some embodiments, the collimated pixel beam is converged by the light modifying device. At step 1414, a diameter of the collimated pixel beam is reduced. In some embodiments, the diameter of the collimated pixel beam is reduced by the light modifying device.

At step 1416, the modified pixel beam is injected into an eyepiece (e.g., eyepieces 202, 402, 502, 602, 702, 802, 902) of the optical system. In some embodiments, the modified pixel beam is injected into an ICG (e.g., ICGs 503, 603, 703, 803, 903) formed on the eyepiece.

At step 1418, the modified pixel beam is outputted from the eyepiece of the optical system. In some embodiments, the modified pixel beam is outputted from a leaky-grating formed on the eyepiece. In some embodiments, the modified pixel beam is outputted from the eyepiece toward a user's eye.

Figure 15:
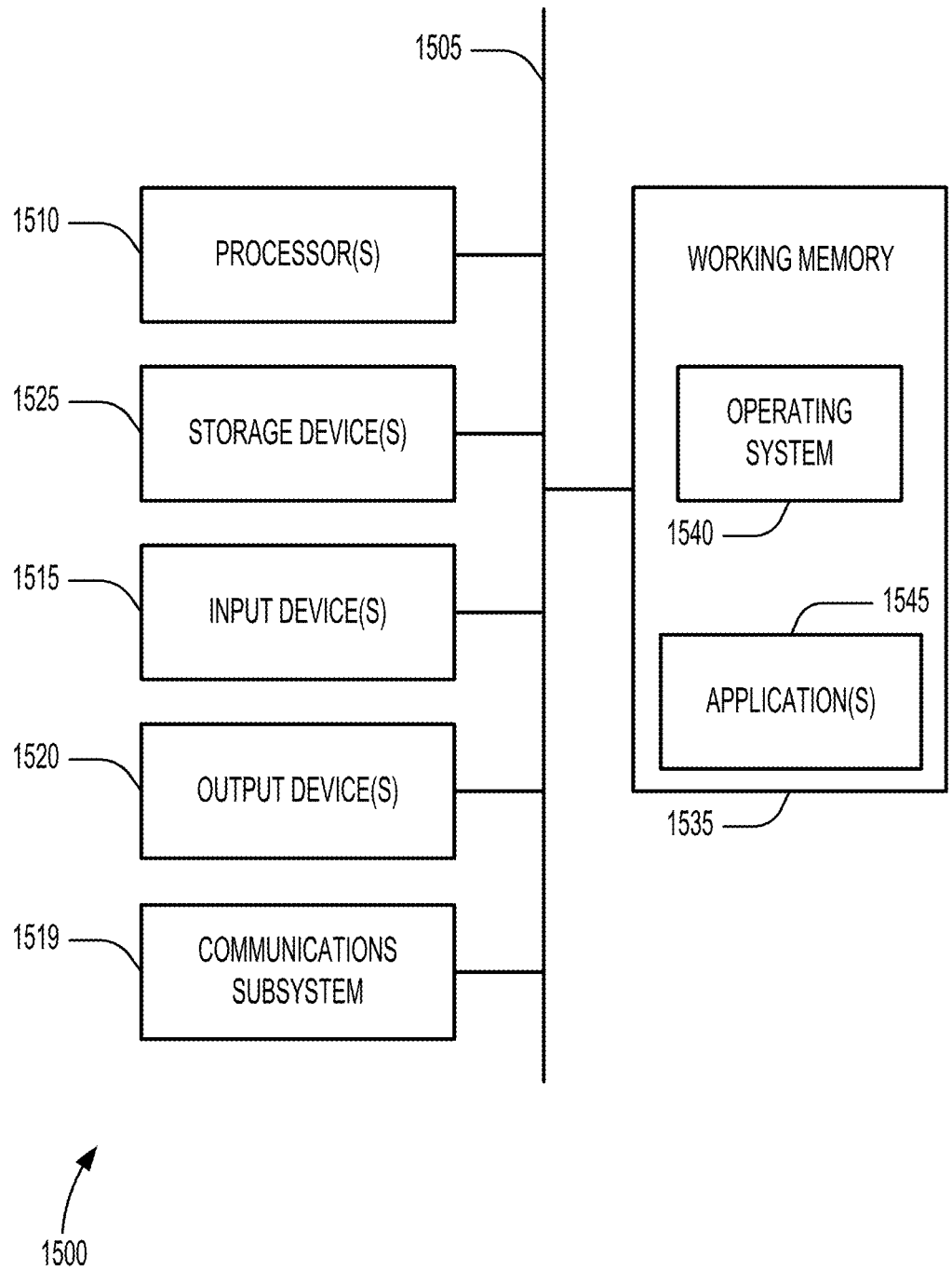
FIG. 15 illustrates a simplified computer system.

FIG. 15 illustrates a simplified computer system 1500 according to an embodiment described herein. Computer system 1500 as illustrated in FIG. 15 may be incorporated into devices described herein. FIG. 15 provides a schematic illustration of one embodiment of computer system 1500 that can perform some or all of the steps of the methods provided by various embodiments. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

Computer system 1500 is shown comprising hardware elements that can be electrically coupled via a bus 1505, or may otherwise be in communication, as appropriate. The hardware elements may include one or more processors 1510, including without limitation one or more general-purpose processors and/or one or more special-purpose processors such as digital signal processing chips, graphics acceleration processors, and/or the like; one or more input devices 1515, which can include without limitation a mouse, a keyboard, a camera, and/or the like; and one or more output devices 1520, which can include without limitation a display device, a printer, and/or the like.

Computer system 1500 may further include and/or be in communication with one or more non-transitory storage devices 1525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1500 might also include a communications subsystem 1519, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1519 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1519. In other embodiments, a portable electronic device, e.g. the first electronic device, may be incorporated into computer system 1500, e.g., an electronic device as an input device 1515. In some embodiments, computer system 1500 will further comprise a working memory 1535, which can include a RAM or ROM device, as described above.

Computer system 1500 also can include software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1525 described above. In some cases, the storage medium might be incorporated within a computer system, such as computer system 1500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1500 and/or might take the form of source and/or installable code, which, upon compilation and/or installation on computer system 1500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1500 to perform methods in accordance with various embodiments of the technology. According to a set of embodiments, some or all of the procedures of such methods are performed by computer system 1500 in response to processor 1510 executing one or more sequences of one or more instructions, which might be incorporated into the operating system 1540 and/or other code, such as an application program 1545, contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1500, various computer-readable media might be involved in providing instructions/code to processor(s) 1510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1525. Volatile media include, without limitation, dynamic memory, such as the working memory 1535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1500.

The communications subsystem 1519 and/or components thereof generally will receive signals, and the bus 1505 then might carry the signals and/or the data, instructions, etc. carried by the signals to the working memory 1535, from which the processor(s) 1510 retrieves and executes the instructions. The instructions received by the working memory 1535 may optionally be stored on a non-transitory storage device 1525 either before or after execution by the processor(s) 1510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical system, the method comprising:
   generating, by a projector of the optical system, a collimated pixel beam associated with a virtual object to be displayed;
   providing the collimated pixel beam to a light modifying device, wherein the light modifying device is configured to switch between:
      passing the collimated pixel beam through the light modifying device without modification to the collimated pixel beam; and
      modifying the collimated pixel beam to generate a modified pixel beam;
   injecting either the collimated pixel beam or the modified pixel beam into an eyepiece of the optical system; and
   outputting either the collimated pixel beam or the modified pixel beam from the eyepiece toward a user side of the optical system.

2. The method of claim 1, wherein the light modifying device is configured to switch between passing the collimated pixel beam and modifying the collimated pixel beam based on a virtual distance associated with the virtual object.

3. The method of claim 2, wherein the light modifying device is configured to switch from passing the collimated pixel beam to modifying the collimated pixel beam based on an increase of the virtual distance associated with the virtual object.

4. The method of claim 2, wherein the light modifying device is configured to switch from passing the collimated pixel beam to modifying the collimated pixel beam based on a decrease of the virtual distance associated with the virtual object.

5. The method of claim 2, further comprising:
   determining the virtual distance associated with the virtual object.

6. The method of claim 5, further comprising:
   comparing the virtual distance to at least one distance threshold, wherein the light modifying device is configured to switch between passing the collimated pixel beam and modifying the collimated pixel beam based on the comparison between the virtual distance and the at least one distance threshold.

7. The method of claim 6, wherein the at least one distance threshold includes a lower distance threshold and an upper distance threshold.

8. The method of claim 1, wherein modifying the collimated pixel beam includes:
   converging the collimated pixel beam.

9. The method of claim 1, wherein modifying the collimated pixel beam includes:
   reducing a diameter of the collimated pixel beam.

10. The method of claim 1, wherein the light modifying device includes a set of lenses including a first lens and a second lens, wherein the first lens and the second lens are configured to be positioned at different distances from each other.

11. An optical system comprising:
    a projector configured to generate a collimated pixel beam associated with a virtual object to be displayed;
    a light modifying device configured to receive the collimated pixel beam and to switch between:
       passing the collimated pixel beam through the light modifying device without modification to the collimated pixel beam; and
       modifying the collimated pixel beam to generate a modified pixel beam; and
    an eyepiece configured to receive either the collimated pixel beam or the modified pixel beam from the light modifying device and to output either the collimated pixel beam or the modified pixel beam toward a user side of the optical system.

12. The optical system of claim 11, wherein the light modifying device is configured to switch between passing the collimated pixel beam and modifying the collimated pixel beam based on a virtual distance associated with the virtual object.

13. The optical system of claim 12, wherein the light modifying device is configured to switch from passing the collimated pixel beam to modifying the collimated pixel beam based on an increase of the virtual distance associated with the virtual object.

14. The optical system of claim 12, wherein the light modifying device is configured to switch from passing the collimated pixel beam to modifying the collimated pixel beam based on a decrease of the virtual distance associated with the virtual object.

15. The optical system of claim 12, further comprising:
a processing module configured to:
  determine the virtual distance associated with the virtual object.

16. The optical system of claim 15, wherein the processing module is further configured to:
  compare the virtual distance to at least one distance threshold, wherein the light modifying device is configured to switch between passing the collimated pixel beam and modifying the collimated pixel beam based on the comparison between the virtual distance and the at least one distance threshold.

17. The optical system of claim 16, wherein the at least one distance threshold includes a lower distance threshold and an upper distance threshold.

18. The optical system of claim 11, wherein modifying the collimated pixel beam includes:
  converging the collimated pixel beam.

19. The optical system of claim 11, wherein modifying the collimated pixel beam includes:
  reducing a diameter of the collimated pixel beam.

20. The optical system of claim 11, wherein the light modifying device includes a set of lenses including a first lens and a second lens, wherein the first lens and the second lens are configured to be positioned at different distances from each other.

* * * * *